United States Patent
Zhang et al.

(10) Patent No.: US 11,569,902 B2
(45) Date of Patent: Jan. 31, 2023

(54) ELECTRONIC EQUIPMENT, USER EQUIPMENT, WIRELESS COMMUNICATION METHOD, AND STORAGE MEDIUM

(71) Applicant: Sony Corporation, Tokyo (JP)

(72) Inventors: Yuan Zhang, Nanjing (CN); Penshun Lu, Beijing (CN); Wenbo Zhang, Beijing (CN); Hiromasa Uchiyama, Beijing (CN)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 17/045,761

(22) PCT Filed: Jun. 12, 2019

(86) PCT No.: PCT/CN2019/090805
§ 371 (c)(1),
(2) Date: Oct. 7, 2020

(87) PCT Pub. No.: WO2019/242537
PCT Pub. Date: Dec. 26, 2019

(65) Prior Publication Data
US 2021/0058147 A1 Feb. 25, 2021

(30) Foreign Application Priority Data
Jun. 19, 2018 (CN) .......................... 201810631484.8

(51) Int. Cl.
*H04B 7/185* (2006.01)
*H04W 74/08* (2009.01)

(52) U.S. Cl.
CPC ..... *H04B 7/18513* (2013.01); *H04B 7/18515* (2013.01); *H04W 74/0833* (2013.01)

(58) Field of Classification Search
CPC ..... H04B 7/18513–18523; H04B 7/18; H04W 74/0833
See application file for complete search history.

(56) References Cited

U.S. PATENT DOCUMENTS

2016/0323032 A1   11/2016 Ulupinar et al.
2017/0230104 A1*  8/2017 Purkayastha ........ H04B 7/2041
(Continued)

FOREIGN PATENT DOCUMENTS

CN  103379435 A  10/2013
CN  103427937 A  12/2013
(Continued)

OTHER PUBLICATIONS

International Search Report and Written Opinion dated Aug. 22, 2019 for PCT/CN2019/090805 filed on Jun. 12, 2019, 9 pages including English Translation of the International Search Report.

*Primary Examiner* — Khaled M Kassim
*Assistant Examiner* — Najeeb Ansari
(74) *Attorney, Agent, or Firm* — Xsensus LLP

(57) ABSTRACT

An electronic equipment, a user equipment, a wireless communication method, and a storage medium, the electronic equipment comprising a processing circuit and being configured to: receive from a user equipment a random access request message that is expected to access a satellite equipment; and in response to the random access request message, send to the user equipment the advance in timing between the user equipment and the satellite equipment to be accessed. By using said electronic equipment, user equipment, wireless communication method, and storage medium, a user equipment in a satellite communication system may more quickly and efficiently acquire control information relating to uplink transmission.

16 Claims, 17 Drawing Sheets

(56) References Cited

U.S. PATENT DOCUMENTS

| | | | | |
|---|---|---|---|---|
| 2018/0279348 A1* | 9/2018 | Huang | .............. | H04W 72/1263 |
| 2018/0324869 A1* | 11/2018 | Phuyal | .................. | H04W 72/14 |
| 2021/0029658 A1* | 1/2021 | Mahalingam | ...... | H04B 7/18513 |

FOREIGN PATENT DOCUMENTS

| | | | |
|---|---|---|---|
| CN | 103945471 A | 7/2014 |
| CN | 103945471 A | 7/2014 |

\* cited by examiner

ELECTRONIC EQUIPMENT, USER EQUIPMENT, WIRELESS COMMUNICATION METHOD, AND STORAGE MEDIUM

CROSS-REFERENCE TO RELATED APPLICATIONS

The present application is based on PCT filing PCT/CN2019/090805, filed Jun. 12, 2019, which claims priority to Chinese Patent Application No. 201810631484.8, filed Jun. 19, 2018 with the Chinese Patent Office, each of which is incorporated herein by reference in its entirety.

FIELD

Embodiments of the present disclosure generally relates to the field of wireless communications, and in particular to an electronic equipment, a user equipment, a wireless communication method and a computer readable storage medium. More particularly, the present disclosure relates to an electronic equipment serving as a network side equipment in a wireless communication system, a user equipment in a wireless communication system, a wireless communication method performed by a network side equipment in a wireless communication system, a wireless communication method performed by a user equipment in a wireless communication system and a computer readable storage medium.

BACKGROUND

In a satellite communication system, a user equipment may directly communicate with a satellite equipment so as to exchange control information and data information. That is, the user equipment may send uplink control information and uplink data information to the satellite equipment via an uplink and the satellite equipment may send downlink control information and downlink data information to the user equipment via a downlink.

As is well-known, the satellite equipment is far from the ground. That is, the satellite equipment is far from the user equipment. Therefore, communications between the user equipment and the satellite equipment may consume relatively large transmission power and result in relatively large time delay, which are more obvious in uplink transmission. Before performing data transmission with the satellite equipment, the user equipment is required to acquire control information related to the data transmission from the satellite equipment, resulting in large transmission power consumption and a large time delay. In addition, multiple user equipments in close proximity to each other may acquire the same or similar control information related to data transmission. Therefore, a case that each of multiple users acquires the control information from the satellite equipment may result in unnecessary overhead.

Therefore, it is required to provide a technical solution, to assist a user equipment in a satellite communication system in acquiring control information related to data transmission quickly and effectively, thereby improving transmission between the user equipment and the satellite equipment.

SUMMARY

The summary part provides a general summary of the present disclosure, rather than a comprehensive disclosure of a full scope or all features of the present disclosure.

An object of the present disclosure is to provide an electronic equipment, a user equipment, a wireless communication method and a computer readable storage medium, to assist a user equipment in a satellite communication system in acquiring control information related to data transmission quickly and effectively, thereby improving transmission between the user equipment and a satellite equipment.

According to an aspect of the present disclosure, an electronic equipment is provided. The electronic equipment includes processing circuitry. The processing circuitry is configured to: receive, from a user equipment, a random access request message of desiring to access a satellite equipment; and send a time advance between the user equipment and a satellite equipment to be accessed, to the user equipment, in response to the random access request message.

According to another aspect of the present disclosure, a user equipment is provided. The user equipment includes processing circuitry. The processing circuitry is configured to: send, to a network side equipment, a random access request message of desiring to access a satellite equipment; and receive, from the network side equipment, a time advance between the user equipment and a satellite equipment that the user equipment is to access.

According to another aspect of the present disclosure, a wireless communication method performed by an electronic equipment is provided. The method includes: receiving, from a user equipment, a random access request message of desiring to access a satellite equipment; and sending, to the user equipment, a time advance between the user equipment and a satellite equipment to be accessed in response to the random access request message.

According to another aspect of the present disclosure, a wireless communication method performed by a user equipment is provided. The method includes: sending, to a network side equipment, a random access request message of desiring to access a satellite equipment; and receiving, from the network side equipment, a time advance between the user equipment and a satellite equipment that the user equipment is to access.

According to another aspect of the present disclosure, a computer readable storage medium is provided. The computer readable storage medium includes executable computer instructions that, when executed by a computer, cause the computer to perform the wireless communication method according to the present disclosure.

With the electronic equipment, the user equipment, the wireless communication method and the computer readable storage medium according to the present disclosure, the electronic equipment may configure control information related to data transmission between the user equipment and a satellite equipment and send the configured control information to the user equipment. In this way, the electronic equipment may assist the user equipment in acquiring the control information related to the data transmission, thereby preventing the user equipment from acquiring the control information from the satellite equipment with large transmission power and large time delay. In addition, the electronic equipment may assist multiple user equipments in acquiring the control information, thereby avoiding redundant acquisition. In view of the above, with the electronic equipment, the user equipment, the wireless communication method and the computer readable storage medium according to the present disclosure, a user equipment in a satellite communication system can acquire the control information related to uplink transmission quickly and effectively, thereby improving transmission between the user equipment and the satellite equipment.

A further applicable field becomes apparent from the description herein. The description and specific examples in the summary are only illustrative and are not intended to limit the scope of the present disclosure.

BRIEF DESCRIPTION OF THE DRAWINGS

The drawings described herein are used for illustrating the selected embodiments only rather than all of possible embodiments, and are not intended to limit the scope of the present disclosure. In the drawings.

Figure 1:
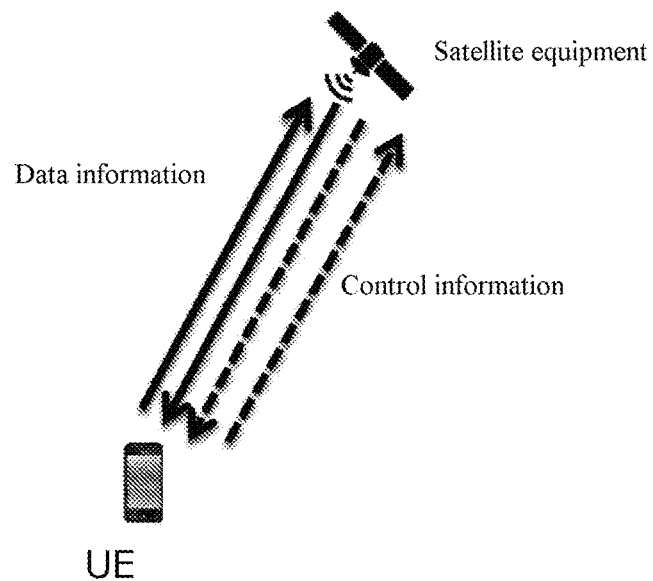
FIG. 1 is a schematic diagram showing communications between a UE (User Equipment) and a satellite equipment.

Although the present disclosure is susceptible to various modifications and substitutions, specific embodiments thereof are shown in the drawings as examples and are described in detail herein. However, it should be understood that the description of specific embodiments herein is not intended to limit the present disclosure into a disclosed specific form. Instead, the present disclosure aims to cover all modifications, equivalents and substitutions within the spirit and the scope of the present disclosure. It should be noted that, corresponding reference numerals indicate corresponding components throughout the drawings.

DETAILED DESCRIPTION OF EMBODIMENTS

Examples of the present disclosure are described more fully with reference to the drawings. The following description is merely illustrative in nature and is not intended to limit the present disclosure, application or use.

Exemplary embodiments are provided so that the present disclosure can become exhaustive and the scope of the present disclosure can be fully conveyed to those skilled in the art. Examples of various specific details such as specific components, apparatuses, and methods are set forth to provide detailed understanding of the embodiments of the present disclosure. It is apparent to those skilled in the art that without specific details, the exemplary embodiments may be implemented in multiple different forms, none of which is construed as limiting the scope of the present disclosure. In some exemplary embodiments, well-known processes, well-known structures, and well-known technologies are not described in detail.

Exemplary embodiments are described in the following order:
1. Description of a scenario
2. Configuration example for a network side equipment
3. Configuration example for a user equipment
4. Method embodiment
5. Application example 1. Description of a Scenario FIG. 1 is a schematic diagram showing communications between a UE and a satellite equipment. As shown in FIG. 1, a solid line between the UE and the satellite equipment represents transmission of data information and a dotted line between the UE and the satellite equipment represents transmission of control information. That is, the user equipment may send uplink control information and uplink data information to the satellite equipment via an uplink and the satellite equipment may send downlink control information and downlink data information to the user equipment via a downlink. As described above, when the user equipment acquires control information related to data transmission from the satellite equipment, large transmission power may be consumed and large time delay may be caused. In addition, a case that each of multiple user equipments in close proximity to each other acquires the control information from the satellite equipment may result in unnecessary overhead.

A solution is provided according to the present disclosure to expect a network side equipment on the ground to assist a user equipment in acquiring control information, thereby preventing the user equipment from acquiring control information from the satellite equipment with large transmission power and large time delay. In addition, the network side equipment may assist multiple user equipments in acquiring the control information, thereby avoiding redundant acquisition.

Figure 2A:
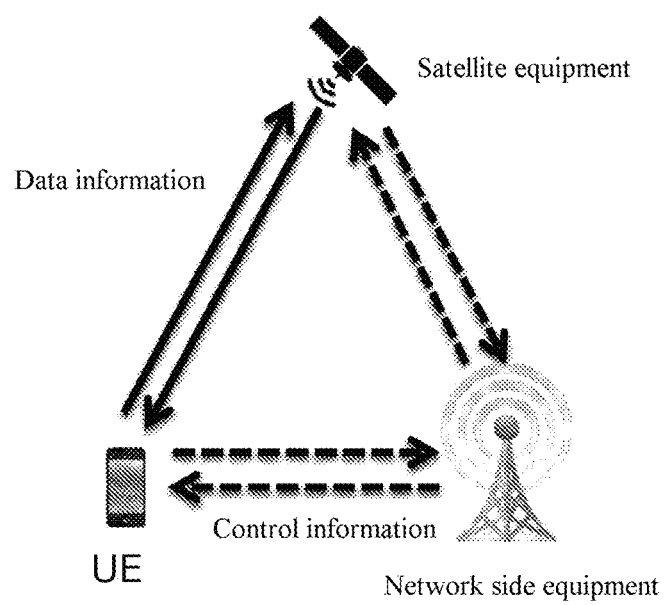
FIG. 2(a) is a schematic diagram showing communications between a UE and a satellite equipment according to an embodiment of the present disclosure.
Figure 2B:
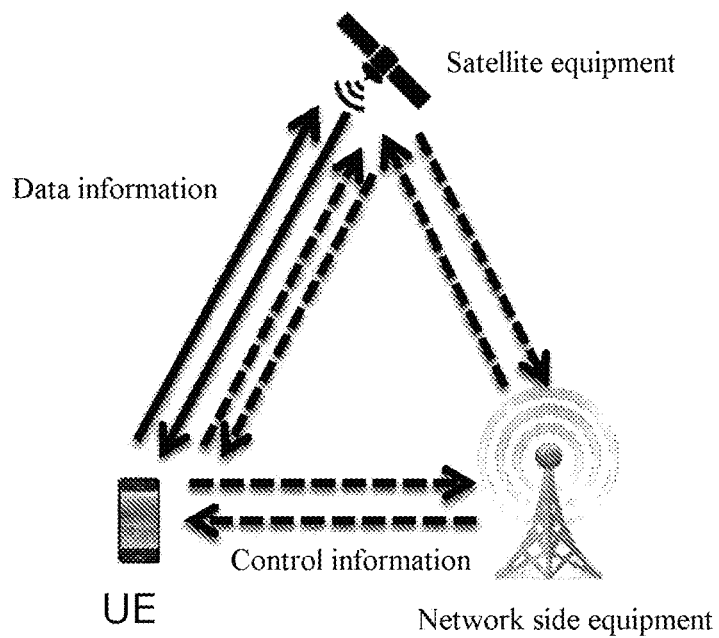
FIG. 2(b) is a schematic diagram showing communications between a UE and a satellite equipment according to an embodiment of the present disclosure.

FIG. 2(a) is a schematic diagram showing communications between a UE and a satellite equipment according to an embodiment of the present disclosure. As shown in FIG. 2(a), the UE sends and receives data information via a link between the UE and the satellite equipment. Further, the UE may acquire control information between the UE and the satellite equipment via information interaction between the UE and the network side equipment. FIG. 2(b) is a schematic diagram showing communications between a UE and a satellite equipment according to an embodiment of the present disclosure. In the example shown in FIG. 2(b), the UE may not only acquire partial control information between the UE and the satellite equipment via a network side equipment, but also directly acquire partial control information from the satellite equipment.

According to an embodiment of the present disclosure, each of the user equipment, the network side equipment and the satellite equipment may be arranged in a wireless communication system. The wireless communication system herein may be a satellite communication system. The satellite equipment may have all functions of a base station equipment. In addition, the satellite equipment may only have a function of transmitting and receiving. The satellite equipment may process information via a processor arranged on the ground.

Further, the network side equipment according to the present disclosure may be a network side equipment having a function of transmitting and receiving information on the ground. For example, the network side equipment may be a transceiver on the ground. In this case, the network side equipment may be a transmitting-receiving equipment specifically for assisting a UE in acquiring control information related to data communications between the UE and the satellite equipment. That is, multiple transmitting-receiving equipments may be arranged on the ground based on geographic positions. Each of the multiple transmitting-receiving equipments may assist a UE in a certain range around the transmitting-receiving equipment in acquiring control information related to data communications between the UE and the satellite equipment. In addition, the network side equipment may also be, for example, a TRP (Transmit and Receive Port) or a base station equipment. The TRP may have a function of transmitting and receiving. For example, the TRP may receive information from a user equipment and a base station equipment and may further send information to a user equipment and a base station equipment. In an example, the TRP may serve a user equipment and may be controlled by a base station equipment. That is, the base station equipment serves the user equipment via the TRP. The base station equipment, for example, may be an eNB or a gNB (a base station in a fifth generation communication system).

The user equipment according to the present disclosure may be a mobile terminal (such as a smartphone, a tablet personal computer (PC), a notebook PC, a portable game terminal, a portable/dongle mobile router and a digital camera) or a vehicle terminal (such as a vehicle navigation equipment). The user equipment may further be implemented as a terminal performing machine to machine (M2M) communications (which is also referred to as a machine type communication (MTC) terminal). In addition, the user equipment may further be a wireless communication module (such as an integrated circuitry module including a single wafer) mounted on each of the above terminals.

2. Configuration Example for a Network Side Equipment

Figure 3:
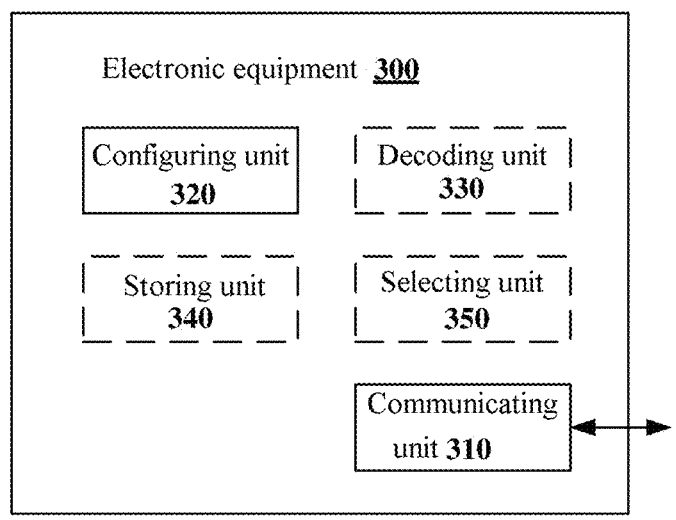
FIG. 3 is a block diagram showing a configuration example of an electronic equipment according to an embodiment of the present disclosure.

FIG. 3 is a block diagram showing a configuration example of an electronic equipment 300 according to an embodiment of the present disclosure. The electronic equipment 300 may serve as a network side equipment in a wireless communication system. Specifically, the electronic equipment 300 may serve as a network side equipment having a function of transmitting and receiving information on the ground in a wireless communication system, such as a base station equipment or a TRP.

As shown in FIG. 3, the electronic equipment 300 may include a communicating unit 310 and a configuring unit 320.

Here, units of the electronic equipment 300 may be included in processing circuitry. It should be noted that the electronic equipment 300 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to an embodiment of the present disclosure, the configuring unit 320 may configure control information related to data transmission between a user equipment and a satellite equipment.

According to an embodiment of the present disclosure, the electronic equipment 300 may send the configured control information to the user equipment via the communicating unit 310.

According to an embodiment of the present disclosure, the user equipment may be within a service coverage of the electronic equipment 300. That is, the electronic equipment 300 may be a network side equipment and may send, to each user equipment within the service coverage of the electronic equipment 300, control information configured for the user equipment.

It can be seen that the electronic equipment 300 according to the embodiment of the present disclosure may configure control information related to data transmission between a user equipment and a satellite equipment and send the configured control information to the user equipment. In this way, the electronic equipment 300 may assist the user equipment in acquiring control information related to data transmission, thereby preventing the user equipment from acquiring control information from the satellite equipment with large transmission power and large time delay. In addition, the electronic equipment 300 may assist multiple user equipments in acquiring the control information, thereby avoiding redundant acquisition.

According to an embodiment of the present disclosure, the control information related to data transmission between the user equipment and the satellite equipment may include control information related to uplink data transmission between the user equipment and the satellite equipment.

For example, the control information may include a physical layer parameter related to uplink data transmission between the user equipment and the satellite equipment. The physical layer parameter includes but is not limited to uplink transmission power for the user equipment, a Time Advance (TA) for the user equipment, a Modulation and Coding Scheme (MC S) for the user equipment and uplink resources for the user equipment.

Preferably, the control information may further include information related to a satellite equipment that the user equipment is to access, including but not limited to a satellite equipment initially accessed by the user equipment and a satellite equipment to which the user equipment is to switch.

In addition, according to an embodiment of the present disclosure, the electronic equipment 300 may send all control information related to data transmission between the user equipment and the satellite equipment to the user equipment. That is, the user equipment acquires control information from the electronic equipment 300 rather than the satellite equipment. Further, according to an embodiment of the present disclosure, the electronic equipment 300 may send partial control information related to data transmission between the user equipment and the satellite equipment to the user equipment. That is, the satellite equipment may also send partial control information related to data transmission between the user equipment and the satellite equipment to the user equipment.

Further, according to an embodiment of the present disclosure, the communicating unit 310 may send the control information by resources different from those used by a satellite equipment. Here the satellite equipment may be a satellite equipment that the user equipment is to access or a satellite equipment currently accessed by the user equipment. Here, different resources include different time resources and different frequency resources.

Figure 4:
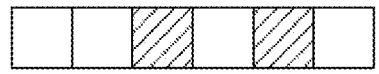
FIG. 4 is a schematic diagram showing a process of sending control information in a time division multiplexing manner by a network side equipment and a satellite equipment according to an embodiment of the present disclosure.

FIG. 4 is a schematic diagram showing a process of sending control information in a time division multiplexing manner by a network side equipment and a satellite equipment according to an embodiment of the present disclosure. FIG. 4 shows time domain resources for sending the control information to the user equipment. For example, each square in FIG. 4 represents a subframe. In a conventional design, all subframes are used for the satellite equipment to send the control information to the user equipment. According to the embodiment of the present disclosure, the satellite equipment may select one or more blank subframes (represented by squares with oblique lines) from all subframes. In the blank subframes, the satellite equipment does not send the control information to the user equipment. In this way, the electronic equipment 300 may send the control information to the user equipment by using the blank subframes. That is, the electronic equipment 300 and the satellite equipment send the control information to the user equipment in the time division multiplexing manner.

In addition, the electronic equipment 300 and the satellite equipment may also send the control information to the user equipment in a frequency division multiplexing manner or another multiplexing manner, which is not limited in the present disclosure.

According to an embodiment of the present disclosure, the electronic equipment 300 may use control information related to uplink data transmission between the electronic equipment 300 and the satellite equipment as control information related to uplink data transmission between the user equipment and the satellite equipment. That is, the electronic equipment 300 may instead the user equipment calculating or acquiring the control information related to data transmission between the electronic equipment 300 and the satellite equipment. The measured or acquired control information serves as the control information related to data transmission between the user equipment and the satellite equipment.

A process of acquiring the control information by the user equipment is described below based on types of the control information.

According to an embodiment of the present disclosure, the control information may include a TA for the user equipment. That is, the configuring unit 320 may configure a TA for the user equipment. According to an embodiment of the present disclosure, when initially accessing a satellite equipment, the user equipment may acquire a TA and update the TA based on a certain rule.

According to an embodiment of the present disclosure, the electronic equipment 300 may receive, from a user equipment, a random access request message of desiring to access a satellite equipment via the communicating unit 310.

Further, according to an embodiment of the present disclosure, in response to the random access request message, the configuring unit 320 may configure control information including a TA between the user equipment and a satellite equipment to be accessed, and send the TA between the user equipment and the satellite equipment to be accessed to the user equipment via the communicating unit 310.

According to an embodiment of the present disclosure, the communicating unit 310 of the electronic equipment 300 may send the TA via a random access response message.

Figure 5:
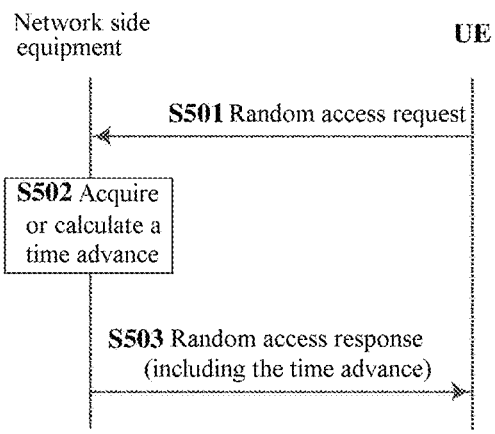
FIG. 5 is a flowchart showing signaling for acquiring a time advance by a UE according to an embodiment of the present disclosure.

FIG. 5 is a flowchart showing signaling for acquiring a time advance by a UE according to an embodiment of the present disclosure. As shown in FIG. 5, in step S501, the UE sends a random access request message to a network side equipment. Next, in step S502, the network side equipment acquires a TA of an uplink between the network side equipment and a satellite equipment from the satellite equipment or calculates a TA of the uplink between the network side equipment and the satellite equipment. Next, in step S503, the network side equipment sends a random access response message to the UE. The random access response message includes the calculated or acquired TA.

According to an embodiment of the present disclosure, the random access request message may include a random access code representing that the user equipment desires to access a satellite equipment. As shown in FIG. 3, the electronic equipment 300 may further include a decoding unit 330. The decoding unit 330 is configured to decode the random access request message to acquire the random access code in the random access request message. Further, the decoding unit 330 may determine that the user equipment desires to access a satellite equipment based on the acquired random access code, such that the configuring unit 320 may configure a TA of a data link between the user equipment and the satellite equipment for the user equipment. In addition, in a case that the decoding unit 330 determines that the user equipment desires to access the electronic equipment 300 based on the acquired random access code, the configuring unit 320 may configure a TA of a data link between the user equipment and the electronic equipment 300 for the user equipment.

As described above, the electronic equipment 300 may instead the user equipment calculating or acquiring the control information related to the data transmission between the electronic equipment 300 and the satellite equipment, and use the control information related to data transmission between the electronic equipment 300 and the satellite equipment as the control information related to data transmission between the user equipment and the satellite equipment. Therefore, according to an embodiment of the present disclosure, the configuring unit 320 may use a TA between the electronic equipment 300 and the satellite equipment to be accessed as a TA between the user equipment and the satellite equipment to be accessed.

According to an embodiment of the present disclosure, the TA between the electronic equipment 300 and the satellite equipment that the user equipment is to access may be calculated by the satellite equipment that the user equipment is to access. The communicating unit 310 of the electronic equipment 300 may receive the TA between the electronic equipment 300 and the satellite equipment that the user equipment is to access from the satellite equipment that the user equipment is to access. Further, the electronic equipment 300 may send pilot frequency information to the satellite equipment, such that the satellite equipment may calculate the TA between the electronic equipment 300 and the satellite equipment based on the pilot frequency information.

According to an embodiment of the present disclosure, the TA between the electronic equipment 300 and the satellite equipment that the user equipment is to access may be calculated by the electronic equipment 300. For example, the configuring unit 320 may calculate the TA based on a position of the satellite equipment that the user equipment is to access. According to an embodiment of the present disclosure, the electronic equipment 300 may send a satellite position request message to the satellite equipment and receive a satellite position response message from the satellite equipment. The response message carries the position of the satellite. Specifically, the configuring unit 320 may calculate the TA between the electronic equipment 300 and the satellite equipment based on a distance between the electronic equipment 300 and the satellite equipment that the user equipment is to access. For example, the configuring unit 320 may acquire the TA by dividing the distance between the electronic equipment 300 and the satellite equipment that the user equipment is to access by the velocity of light.

In addition, according to an embodiment of the present disclosure, as shown in FIG. 3, the electronic equipment 300 may further include a storing unit 340. The storing unit 340 is configured to store a correspondence between time information and a TA. As is well-known, orbit information of a satellite equipment is fixed. Therefore, a position of the satellite equipment at every time instant is fixed and there is a correspondence between time information and a position of the satellite equipment. According to an embodiment of the present disclosure, the electronic equipment 300 may calculate, based on a position of the satellite equipment at each time instant, a TA between the electronic equipment 300 and the satellite equipment at the time instant, thereby establishing a correspondence table representing a correspondence between a time instant and a TA between the electronic equipment 300 and the satellite equipment. According to an embodiment of the present disclosure, the configuring unit 320 may acquire the TA between the electronic equipment 300 and the satellite equipment by looking up the table based on current time information.

Further, according to an embodiment of the present disclosure, the electronic equipment 300 may serve multiple user equipments. If another user equipment acquires a TA between the electronic equipment 300 and the satellite equipment from the electronic equipment 300 in a predetermined time period before a current time instant, the electronic equipment 300 may directly use the TA as the TA between the electronic equipment 300 and the satellite equipment without recalculation.

Figure 6A:
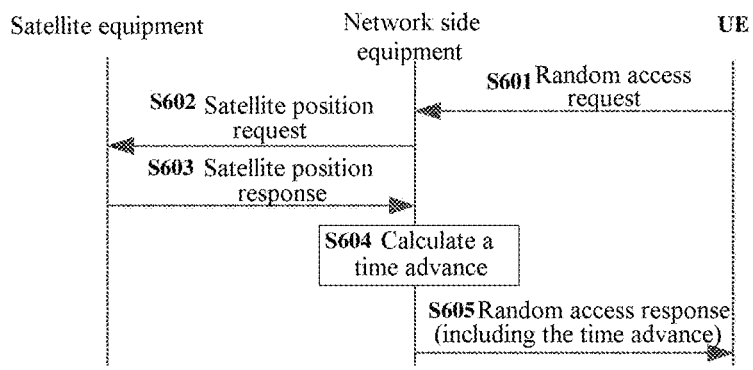
FIG. 6(a) is a flowchart showing signaling for acquiring a time advance by a UE according to an embodiment of the present disclosure.
Figure 6B:
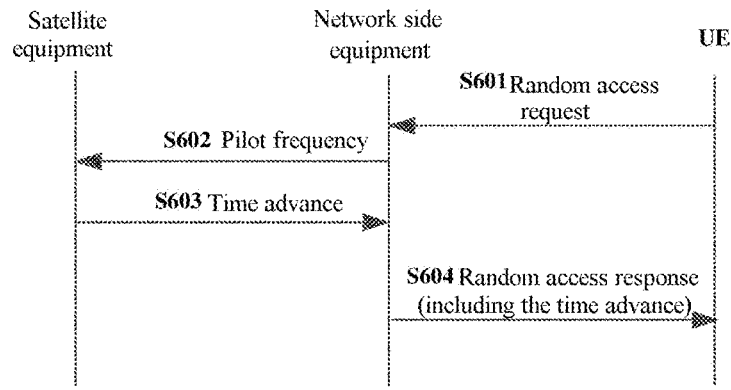
FIG. 6(b) is a flowchart showing signaling for acquiring a time advance by a UE according to another embodiment of the present disclosure.
Figure 6C:
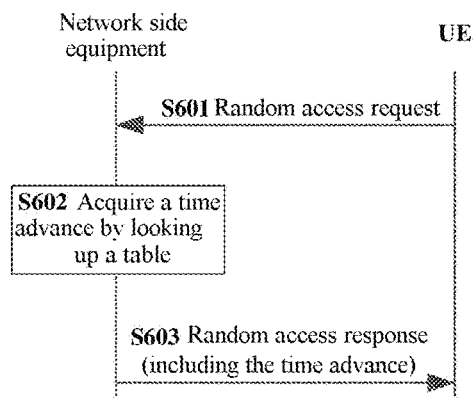
FIG. 6(c) is a flowchart showing signaling for acquiring a time advance by a UE according to another embodiment of the present disclosure.

FIG. 6(a) to FIG. 6(c) each is a flowchart showing signaling for acquiring a time advance by a UE according to an embodiment of the present disclosure.

As shown in FIG. 6(a), in step S601, a UE sends a random access request message to a network side equipment. Next, in step S602, the network side equipment sends a satellite position request message to a satellite equipment to request a position of the satellite equipment. Next, in step S603, the satellite equipment sends a satellite position response message to the network side equipment. The satellite position response message carries position information of the satellite equipment. Next, in step S604, the network side equipment calculates a TA between the network side equipment and the satellite equipment based on the position information of the satellite equipment. Next, in step S605, the network side equipment sends a random access response message to the UE. The random access response message includes the calculated TA. In this way, the UE acquires the TA for uplink data transmission.

As shown in FIG. 6(b), in step S601, a UE sends a random access request message to a network side equipment. Next, in step S602, the network side equipment sends a pilot frequency to a satellite equipment. Next, in step S603, the satellite equipment sends a TA between the network side equipment and the satellite equipment to the network side equipment. Next, in step S604, the network side equipment sends a random access response message to the UE. The random access response message includes the TA acquired from the satellite equipment. In this way, the UE acquires the TA for uplink data transmission.

As shown in FIG. 6(c), in step S601, a UE sends a random access request message to a network side equipment. Next, in step S602, the network side equipment determines, based on current time information, a TA between the network side equipment and the satellite equipment by looking up the corresponding table representing a correspondence between a time instant and a TA between the network side equipment and the satellite equipment. Next, in step S603, the network side equipment sends a random access response message to the UE. The random access response message includes the TA acquired by looking up the table. In this way, the UE acquires the TA for uplink data transmission.

According to an embodiment of the present disclosure, the configuring unit 320 may periodically configure an updated TA for a user equipment. The communicating unit 310 may periodically send the updated TA to the user equipment. The communicating unit 310 may periodically broadcast, unicast or multicast the updated TA to the user equipment. For example, the communicating unit 310 may carry information for unicasting via DCI (Downlink Control Information) and carry information for multicasting via GC-PDCCH (Group Common-Physical Downlink Control Channel).

According to an embodiment of the present disclosure, before each uplink transmission of the user equipment or when the user equipment is in a desynchronizing state, the configuring unit 320 may configure an updated TA for the user equipment. According to an embodiment of the present disclosure, before each time the user equipment is required to perform uplink transmission or when the user equipment determines that the user equipment is in a desynchronizing state, the electronic equipment 300 may receive a TA update request massage from the user equipment, and the configuring unit 320 may configure an updated TA in response to the TA update request massage. The communicating unit 310 may sends the updated TA to the user equipment. Further, according to an embodiment of the present disclosure, the electronic equipment 300 may unicast the updated TA to the user equipment sending the TA update request massage. In addition, the electronic equipment 300 may also broadcast the updated TA until receiving a broadcast stopping request message.

Figure 7A:
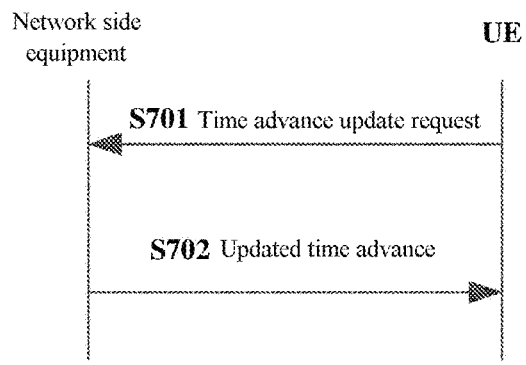
FIG. 7(a) is a flowchart showing signaling for acquiring an updated time advance by a UE according to an embodiment of the present disclosure.
Figure 7B:
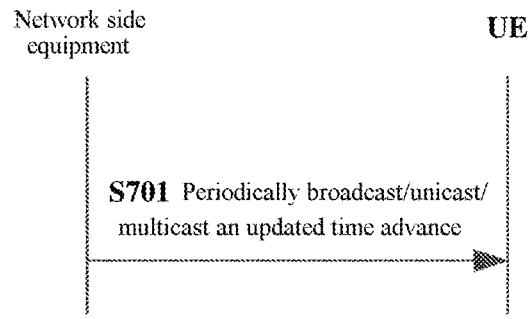
FIG. 7(b) is a flowchart showing signaling for acquiring an updated time advance by a UE according to another embodiment of the present disclosure.
Figure 7C:
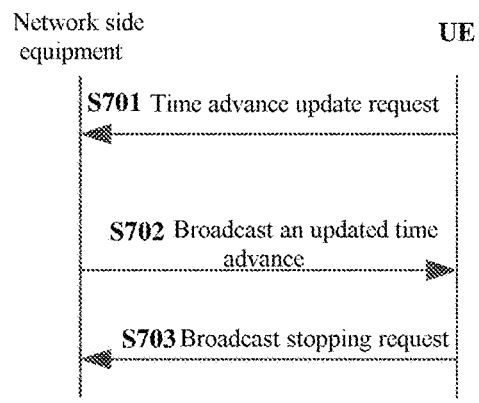
FIG. 7(c) is a flowchart showing signaling for acquiring an updated time advance by a UE according to another embodiment of the present disclosure.

FIG. 7(a) to FIG. 7(c) each is a flowchart showing signaling for acquiring an updated time advance by a UE according to an embodiment of the present disclosure.

As shown in FIG. 7(a), in step S701, a UE may send a TA update request message to a network side equipment. Here when the UE is required to perform uplink transmission or the UE determines that the UE is in a desynchronizing state, the UE sends the TA update request message to the network side equipment. Alternatively, the UE sends the TA update request message to the network side equipment in another case that the UE determines that the UE requires an updated TA. Next, in step S702, the network side equipment sends the updated TA to the UE. Here the network side equipment may acquire or calculate an updated UE in any one of manners described above. In this way, the UE may acquire the updated TA.

As shown in FIG. 7(b), in step S701, a network side equipment periodically broadcasts/unicasts/multicasts an updated TA. Similarly, the network side equipment may acquire or calculate the updated TA in any one of manners described above. In this way, the UE may periodically acquire the updated TA.

As shown in FIG. 7(c), in step S701, a UE sends a TA update request message to a network side equipment. Here, when the UE is required to perform uplink transmission or the UE determines that the UE is in a desynchronizing state, the UE may send the TA update request message to the network side equipment. Alternatively, the UE may send the TA update request message to the network side equipment in another case that the UE determines that the UE requires an updated TA. Next, in step S702, the network side equipment broadcasts the updated TA. Here the network side equipment may periodically broadcast the updated TA. Next, in step S703, the UE sends a broadcast stopping request message to the network side equipment, such that the network side equipment stops broadcasting the updated TA. In this way, the UE may periodically acquire the updated TA.

According to an embodiment of the present disclosure, the electronic equipment 300 may send an initial TA by resources different from those used by a satellite equipment to be accessed. The resources may include time resources and frequency resources. The electronic equipment 300 may send an updated TA by resources different from those used by a satellite equipment currently accessed. The resources may include time resources and frequency resources.

As described above, when initially accessing the satellite equipment, the UE may acquire the TA related to uplink data transmission from the network side equipment. In this way, the UE is not required to calculate the TA between the UE and the satellite equipment, thereby avoiding time delay and power loss. Further, the network side equipment measures the TA between the network side equipment and the satellite equipment as the TA between the user equipment and the satellite equipment, thereby avoiding repeated measurement for multiple user equipments. Further, after accessing the satellite equipment, the UE may acquire the updated TA from the network side equipment. In this way, the UE is not required to calculate the TA between the UE and the satellite equipment, thereby avoiding time delay and power loss. Further, the network side equipment measures the TA between the network side equipment and the satellite equipment as the TA between the user equipment and the satellite equipment, thereby avoiding repeated measurement for multiple user equipments.

According to an embodiment of the present disclosure, the control information may include uplink resources for the user equipment. The configuring unit 320 may configure the control information including the uplink resources.

According to an embodiment of the present disclosure, the communicating unit 310 may receive Buffer Status Report (BSR) information from the user equipment and send the Buffer Status Report information to a satellite equipment currently accessed by the user equipment.

According to an embodiment of the present disclosure, the communicating unit 310 may further receive uplink resource information for the user equipment from the satellite equipment currently accessed by the user equipment and send the uplink resource information to the user equipment.

Here, the BSR may represent a magnitude of resources for uplink data transmission of the user equipment. Therefore, the satellite equipment may determine the uplink resource information for the user equipment based on the BSR of the user equipment.

According to an embodiment of the present disclosure, when only receiving a BSR from one user equipment, the electronic equipment 300 may directly send the BSR to the satellite equipment. When receiving BSRs from multiple user equipments accessing one satellite equipment, the electronic equipment 300 may directly send the multiple BSRs from the multiple user equipments together to the satellite equipment without processing the BSRs from the multiple user equipments. For example, it is assumed that a user equipment 1 and a user equipment 2 currently access one satellite equipment, the user equipment 1 sends a BSR of 10 bits, and the user equipment 2 sends a BSR of 20 bits, the electronic equipment 300 may send the BSR of 10 bits and the BSR of 20 bits together to the satellite equipment. In addition, when receiving BSRs from multiple user equipments accessing one satellite equipment, the electronic equipment 300 may merge the BSRs from the multiple user equipments and send a merged BSR to the satellite equipment. That is, the electronic equipment 300 processes the BSRs from the multiple user equipments. The electronic equipment 300 merges the multiple BSRs from the multiple user equipments into a merged BSR and sends the merged BSR to the satellite equipment. For example, it is assumed that a user equipment 1 and a user equipment 2 currently access one satellite equipment, the user equipment 1 sends a BSR of 10 bits, and the user equipment 2 sends a BSR of 20 bits, the electronic equipment 300 may send a merged BSR of 30 bits to the satellite equipment.

According to an embodiment of the present disclosure, when only receiving a BSR from one user equipment, the satellite equipment may allocate uplink transmission resources for the user equipment based on the BSR. When receiving BSRs not merged from multiple user equipments, the satellite equipment may allocate uplink transmission resources respectively for the multiple user equipments. Further, when receiving BSRs not merged from multiple user equipments, the satellite equipment may allocate uplink transmission resources for the multiple user equipment as a whole. Further, when receiving a merged BSR from multiple user equipments, the satellite equipment may allocate uplink transmission resources for the multiple user equipment as a whole.

According to an embodiment of the present disclosure, when receiving uplink resource information for one user equipment from the satellite equipment, the electronic equipment 300 may directly send the uplink resource information to the user equipment. According to an embodiment of the present disclosure, when receiving merged uplink resource information for multiple user equipments from the satellite equipment, the electronic equipment 300 may determine uplink resource information for each of the multiple user equipments based on the merged uplink resource information. That is, the configuring unit 320 may allocate uplink resources for each user equipment based on the merged uplink resource information, so as to determine uplink resources for each user equipment.

Figure 8A:
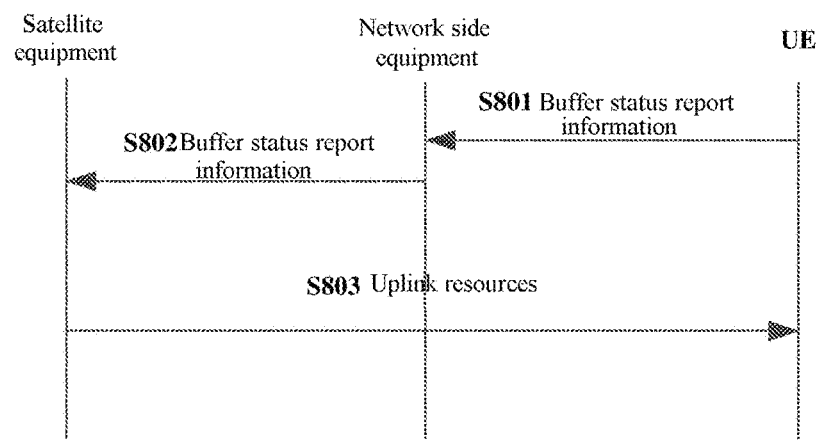
FIG. 8(a) is a flowchart showing signaling for acquiring uplink resources by a UE according to an embodiment of the present disclosure.
Figure 8B:
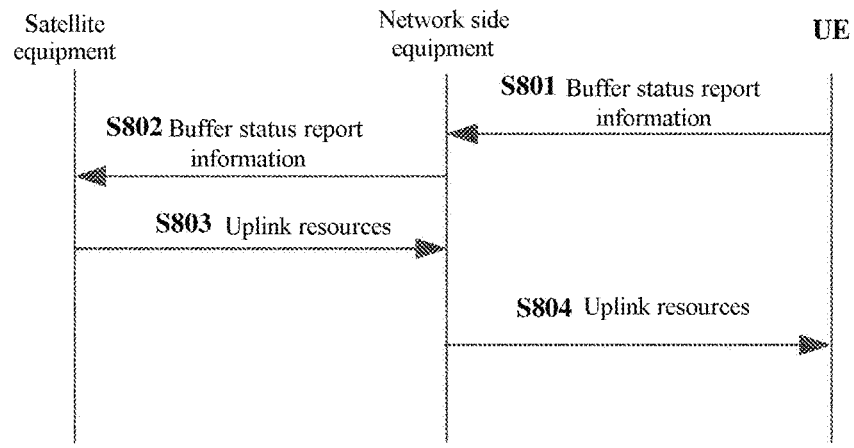
FIG. 8(b) is a flowchart showing signaling for acquiring uplink resources by a UE according to another embodiment of the present disclosure.
Figure 8C:
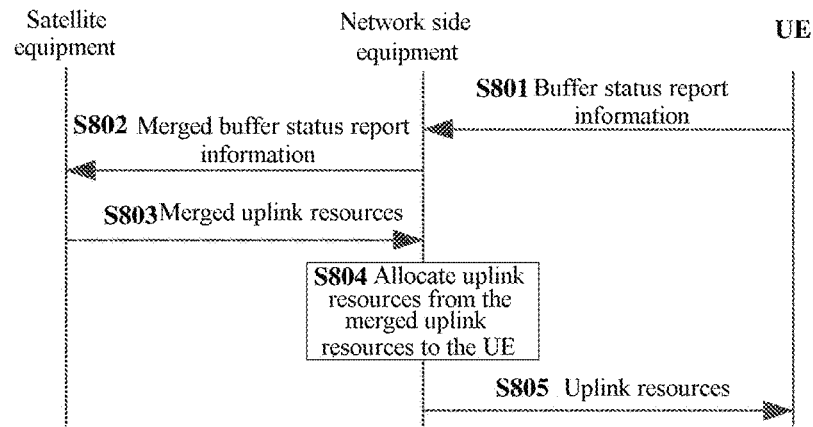
FIG. 8(c) is a flowchart showing signaling for acquiring uplink resources by a UE according to another embodiment of the present disclosure.

FIG. 8(*a*) to FIG. 8(*c*) each is a flowchart showing signaling for acquiring uplink resources by a UE according to an embodiment of the present disclosure.

As shown in FIG. 8(*a*), in step S801, a UE sends BSR information to a network side equipment. Next, in step S802, the network side equipment sends the BSR information to a satellite equipment currently accessed by the UE. Next, in step S803, the satellite equipment allocates uplink resources for the UE and directly sends the uplink resources to the UE. In this example, the satellite equipment may directly determine the uplink resources for the UE and the network side equipment is not required to allocate the uplink resources. Further, the satellite equipment directly sends the allocated uplink resources to the UE.

As shown in FIG. 8(*b*), in step S801, a UE sends BSR information to a network side equipment. Next, in step S802, the network side equipment sends the BSR information to a satellite equipment currently accessed by the UE. Next, in step S803, the satellite equipment allocates uplink resources for the UE and sends the uplink resources to the network side equipment. Next, in step S804, the network side equipment sends the uplink resources to the UE. In this example, the satellite equipment may directly determine the uplink resources for the UE and the network side equipment is not required to allocate the uplink resources. Further, the satellite equipment sends the allocated uplink resources to the UE via the network side equipment.

As shown in FIG. 8(*c*), in step S801, a UE sends BSR information to a network side equipment. Here, it is assumed that the network side equipment receives BSR information from multiple UEs. Next, in step S802, the network side equipment merges the BSRs from the multiple UEs and sends a merged BSR to a satellite equipment. Next, in step S803, the satellite equipment allocates uplink resources for the multiple UEs as a whole and sends merged uplink resources to the network side equipment. Next, in step S804, the network side equipment allocates, from the merged uplink resources, uplink resources for the UE. Next, in step S805, the network side equipment sends, to the UE, the uplink resources allocated for the UE. In this example, the satellite equipment does not directly determine uplink resources for each UE, and the network side equipment allocates uplink resources for each UE.

According to an embodiment of the present disclosure, the electronic equipment 300 may send the uplink resource information by resources different from those used by the satellite equipment currently accessed. The resources may include time resources and frequency resources.

As described above, after accessing the satellite equipment, the UE may acquire uplink resource information from the network side equipment. The UE acquires uplink resource information from the network side equipment before each uplink transmission of the UE. In this way, the UE is not required to acquire the uplink resources from the satellite equipment, thereby avoiding time delay and power loss.

According to an embodiment of the present disclosure, the control information may include uplink transmission power for the user equipment. The configuring unit 320 may configure the control information including the uplink transmission power for uplink data transmission between the user equipment and the satellite equipment.

According to an embodiment of the present disclosure, the configuring unit 320 may periodically configure uplink transmission power information for the user equipment. The communicating unit 310 may periodically send the uplink transmission power information to the user equipment. Here, the communicating unit 310 may periodically broadcast, unicast or multicast the uplink transmission power information. For example, the communicating unit 310 may carry information for unicasting via the DCI and carry information for multicasting via the GC-PDCCH.

According to an embodiment of the present disclosure, the electronic equipment 300 may send uplink transmission power information to the user equipment in response to uplink transmission power request information from the user equipment. According to an embodiment of the present disclosure, the user equipment may send the uplink transmission power request information before each uplink transmission of the user equipment. That is, the electronic equipment 300 may receive the uplink transmission power request information from the user equipment and send the uplink transmission power information to the user equipment before each uplink transmission of the user equipment.

Figure 9A:
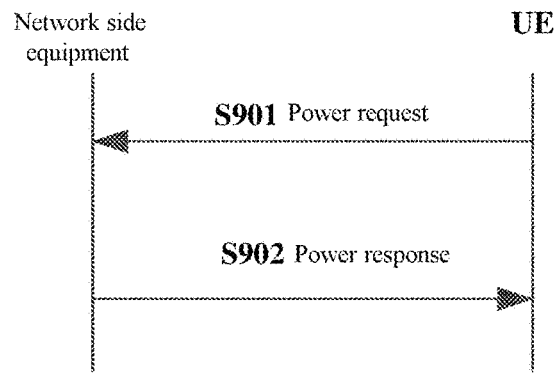
FIG. 9(a) is a flowchart showing signaling for acquiring uplink transmission power by a UE according to an embodiment of the present disclosure.
Figure 9B:
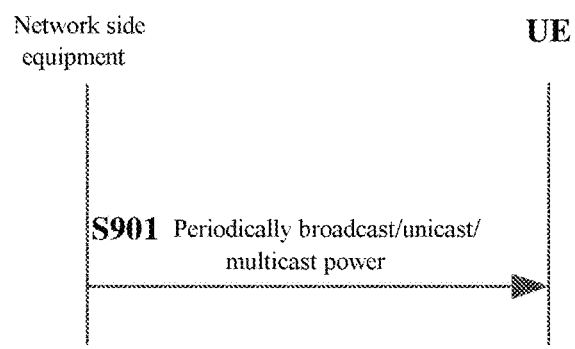
FIG. 9(b) is a flowchart showing signaling for acquiring uplink transmission power by a UE according to another embodiment of the present disclosure.
Figure 9C:
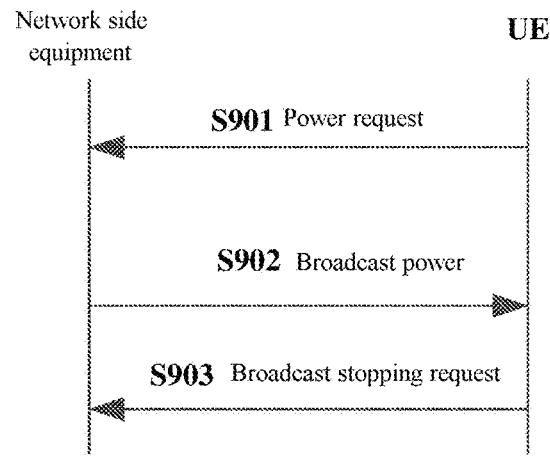
FIG. 9(c) is a flowchart showing signaling for acquiring uplink transmission power by a UE according to another embodiment of the present disclosure.

FIG. 9(a) to FIG. 9(c) each is a flowchart showing signaling for acquiring uplink transmission power by a UE according to an embodiment of the present disclosure.

As shown in FIG. 9(a), in step S901, a UE sends uplink transmission power request information to a network side equipment. Next, in step S902, the network side equipment sends uplink transmission power response information to the UE in response to the uplink transmission power request information from the UE. The uplink transmission power response information includes uplink transmission power for the UE. Here the network side equipment may unicast the uplink transmission power response information to the UE.

As shown in FIG. 9(b), in step S901, a network side equipment periodically broadcasts/unicasts/multicasts uplink transmission power for a UE.

As shown in FIG. 9(c), in step S901, a UE sends uplink transmission power request information to a network side equipment. Next, in step S902, the network side equipment broadcasts uplink transmission power for the UE in response to the uplink transmission power request information from the UE. Next, in step S903, the UE sends a broadcast stopping request to the network side equipment, such that the network side equipment stops broadcasting the uplink transmission power for the UE.

As described above, the electronic equipment 300 may calculate or acquire the control information related to data transmission between the electronic equipment 300 and the satellite equipment for the user equipment and use the control information related to data transmission between the electronic equipment 300 and the satellite equipment as the control information related to data transmission between the user equipment and the satellite equipment. According to an embodiment of the present disclosure, the configuring unit 320 may use the uplink transmission power information for uplink transmission between the electronic equipment 300 and the satellite equipment currently accessed by the user equipment as the uplink transmission power information for the user equipment.

According to an embodiment of the present disclosure, the uplink transmission power for uplink transmission between the electronic equipment 300 and the satellite equipment currently accessed by the user equipment may be calculated by the satellite equipment currently accessed by the user equipment. The communicating unit 310 of the electronic equipment 300 may receive the uplink transmission power for uplink transmission between the electronic equipment 300 and the satellite equipment currently accessed by the user equipment from the satellite equipment currently accessed by the user equipment. Further, the electronic equipment 300 may send pilot frequency information to the satellite equipment for the satellite equipment to calculate uplink transmission power for uplink transmission between the electronic equipment 300 and the satellite equipment based on the pilot frequency information.

According to an embodiment of the present disclosure, the uplink transmission power for uplink transmission between the electronic equipment 300 and the satellite equipment currently accessed by the user equipment may also be calculated by the electronic equipment 300. For example, the configuring unit 320 may calculate the uplink transmission power based on a position of the satellite equipment currently accessed by the user equipment. According to an embodiment of the present disclosure, the electronic equipment 300 may send a satellite position request massage to the satellite equipment and receive a satellite position response massage from the satellite equipment. The response massage carries the position of the satellite. Specifically, the configuring unit 320 may calculate the uplink transmission power for the electronic equipment 300 based on a distance between the electronic equipment 300 and the satellite equipment currently accessed by the user equipment.

In addition, according to an embodiment of the present disclosure, the storing unit 340 of the electronic equipment 300 may further store a correspondence between time information and an uplink transmission power. As is well-known, orbit information of a satellite equipment is fixed. Therefore, a position of the satellite equipment at every time instant is fixed and there is a correspondence between time information and a position of the satellite equipment. According to an embodiment of the present disclosure, the electronic equipment 300 may calculate, based on a position of the satellite equipment at each time instant, uplink transmission power for the electronic equipment 300 at the time instant, thereby establishing a corresponding table representing a correspondence between a time instant and uplink transmission power of the electronic equipment 300. According to an embodiment of the present disclosure, the configuring unit 320 may acquire the uplink transmission power for the electronic equipment 300 by looking up the table based on current time information.

Further, according to an embodiment of the present disclosure, the electronic equipment 300 may serve multiple user equipments. If another user equipment acquires uplink transmission power for the electronic equipment 300 from the electronic equipment 300 in a predetermined time period before a current time instant, the electronic equipment 300 may directly use the uplink transmission power as uplink transmission power for the electronic equipment 300 without recalculation.

Figure 10A:
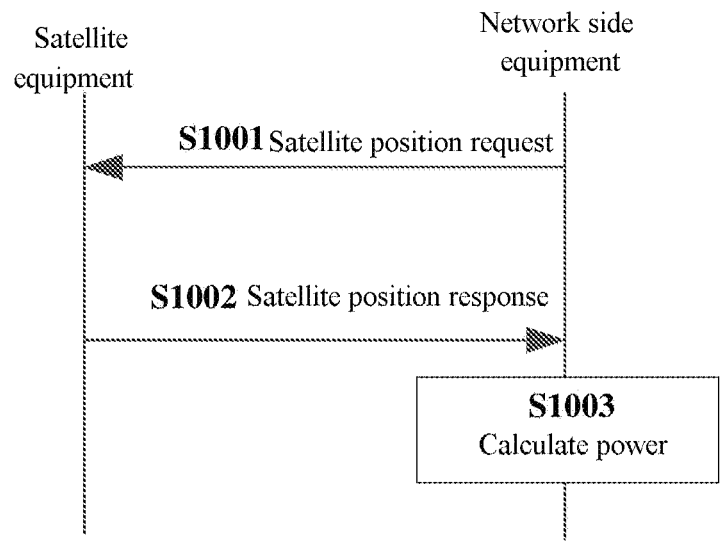
FIG. 10(a) is a flowchart showing signaling for acquiring uplink transmission power for a UE by a network side equipment according to an embodiment of the present disclosure.
Figure 10B:
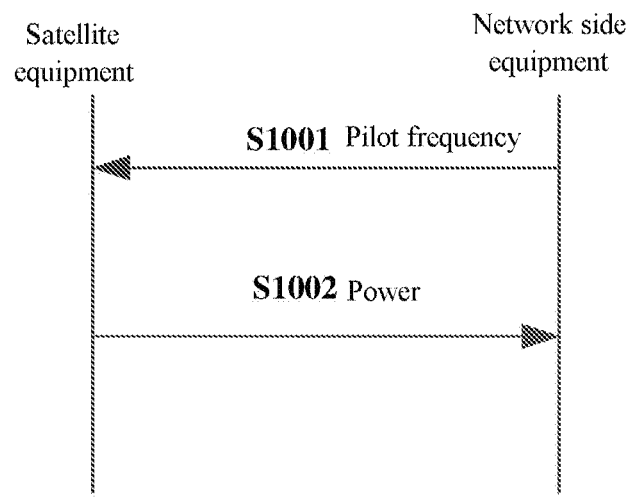
FIG. 10(b) is a flowchart showing signaling for acquiring uplink transmission power for a UE by a network side equipment according to another embodiment of the present disclosure.

FIG. 10(a) to FIG. 10(b) each is a flowchart showing signaling for acquiring uplink transmission power for a UE by a network side equipment according to an embodiment of the present disclosure.

As shown in FIG. 10(a), in step S1001, a network side equipment sends a satellite position request message to a satellite equipment to request a position of the satellite equipment. Next, in step S1002, the satellite equipment sends a satellite position response message to the network side equipment. The satellite position response message carries position information of the satellite equipment. Next, in step S1003, the network side equipment calculates uplink transmission power for the network side equipment based on the position information of the satellite equipment.

As shown in FIG. 10(b), in step S1001, a network side equipment sends a pilot frequency to a satellite equipment. Next, in step S1002, the satellite equipment sends uplink transmission power for the network side equipment to the network side equipment.

FIG. 10(a) and FIG. 10(b) do not show signaling for acquiring, by the electronic equipment 300, uplink transmission power for the electronic equipment 300 by looking up the corresponding table representing a correspondence between time information and uplink transmission power and based on the uplink transmission power for the electronic equipment 300 in the predetermined time period before a current time instant. After acquiring the uplink transmission power for the electronic equipment 300 as described above, the electronic equipment 300 may use the uplink transmission power as uplink transmission power for the user equipment. Then, as shown in step S902 in FIG.

9(a), step S901 in FIG. 9(b) and step S902 in FIG. 9(c), the electronic equipment 300 sends the uplink transmission power for the UE to the UE.

According to an embodiment of the present disclosure, the electronic equipment 300 may send the uplink transmission power information by resources different from those used by the satellite equipment currently accessed. The resources may include time resources and frequency resources.

As described above, after accessing the satellite equipment, the UE may acquire the uplink transmission power from the network side equipment. The UE may acquire the uplink transmission power from the network side equipment before each uplink transmission of the UE. In this way, the UE is not required to acquire the uplink transmission power from the satellite equipment, thereby avoiding time delay and power loss. Further, the network side equipment measures the uplink transmission power for the network side equipment as the uplink transmission power for the user equipment, thereby avoiding repeated measurement for multiple user equipments.

As described above, after accessing the satellite equipment, the UE may acquire, from the network side equipment, the TA, the uplink resource information and the uplink transmission power. Each of the TA, the uplink resource information and the uplink transmission power may be acquired before each uplink transmission of the UE. Further, the network side equipment may send the TA, the uplink resource information and the uplink transmission power to the UE in response to request information from the UE. Therefore, according to an embedment of the present disclosure, the UE may merge request information for requesting two or more of the TA, the uplink resource information and the uplink transmission power and send merged request information. The network side equipment may merge two or more of the TA, the uplink resource information and the uplink transmission power and send merged information to the UE, which is not limited in the present disclosure. For example, the UE may send a piece of request information that carries uplink transmission power request information, TA request information and BSR information to the network side equipment before each uplink transmission, then the network side equipment sends uplink transmission power, a TA and uplink resources to the UE.

According to an embodiment of the present disclosure, the control information may further include information related to a satellite equipment that the user equipment is to access, including a satellite equipment initially accessed by the user equipment. The configuring unit 320 may configure the control information including the satellite equipment initially accessed by the user equipment.

According to an embodiment of the present disclosure, the electronic equipment 300 may receive information related to a communication demand from the user equipment. Further, the electronic equipment 300 may send information on a satellite equipment that the user equipment is to access to the user equipment, in response to the received information related to the communication demand.

Here, the information related to the communication demand includes demand information related to uplink data transmission between the user equipment and the satellite equipment. For example, the information related to the communication demand may include information such as a total data size that the user equipment is required to send, a data transmission rate that the user equipment desires, transmission efficiency that the user equipment desires and energy efficiency that the user equipment desires.

According to an embodiment of the present disclosure, a determination result may be determined by the satellite equipment. That is, the electronic equipment 300 may send the information related to the communication demand received from the user equipment to one or more satellite equipments and receive the determination result from at least one of the one or more satellite equipments. Here the determination result may include, for example, that the satellite equipment allows to be accessed and that the satellite equipment does not allow to be accessed. Further, the electronic equipment 300 may determine, based on the determination result from at least one satellite equipment, a satellite equipment that the user equipment is to access, and send information on the satellite equipment to be accessed, for example, identity information of the satellite equipment to be accessed to the user equipment. Here, the electronic equipment 300, for example, may select one satellite equipment from multiple satellite equipments that allow to be accessed indicated in the determination result, such that the configuring unit 320 may configure the control information including the identity information of the satellite equipment. In addition, the electronic equipment 300 may directly send the received determination result of all satellite equipments to the user equipment, and the user equipment selects a satellite equipment to be accessed. In this example, the configuring unit 320 may configure the control information including the determination result of all satellite equipments received by the electronic equipment 300.

In addition, according to an embodiment of the present disclosure, a satellite equipment that receives the information related to the communication demand may also directly send a determination result of the satellite equipment to the user equipment without sending to the electronic equipment 300.

According to an embodiment of the present disclosure, the determination result may also be determined by the electronic equipment 300. As shown in FIG. 3, the electronic equipment 300 may further include a selecting unit 350 configured to select a satellite equipment that the user equipment is to access based on the information related to the communication demand. Further, according to an embodiment of the present disclosure, the selecting unit 350 may select a satellite equipment for the user equipment based on the information related to the communication demand, orbit information of multiple satellites and the like. Further, the electronic equipment 300 may send identity information of the selected satellite equipment to the user equipment.

Figure 11A:
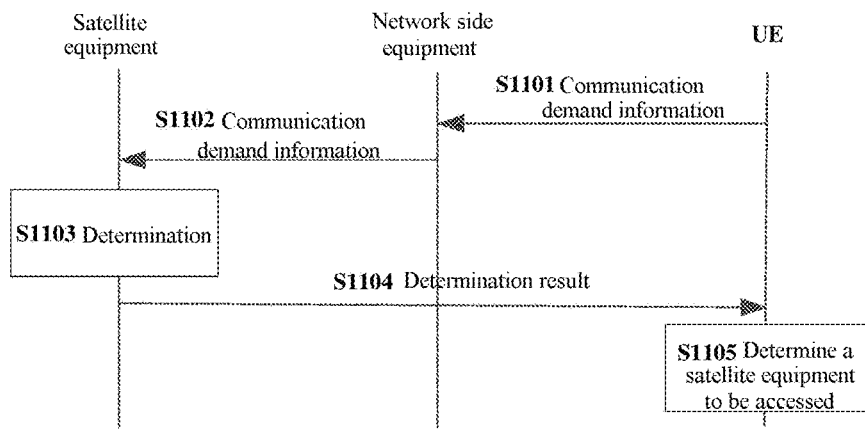
FIG. 11(a) is a flowchart showing signaling for selecting a satellite equipment for a UE according to an embodiment of the present disclosure.
Figure 11B:
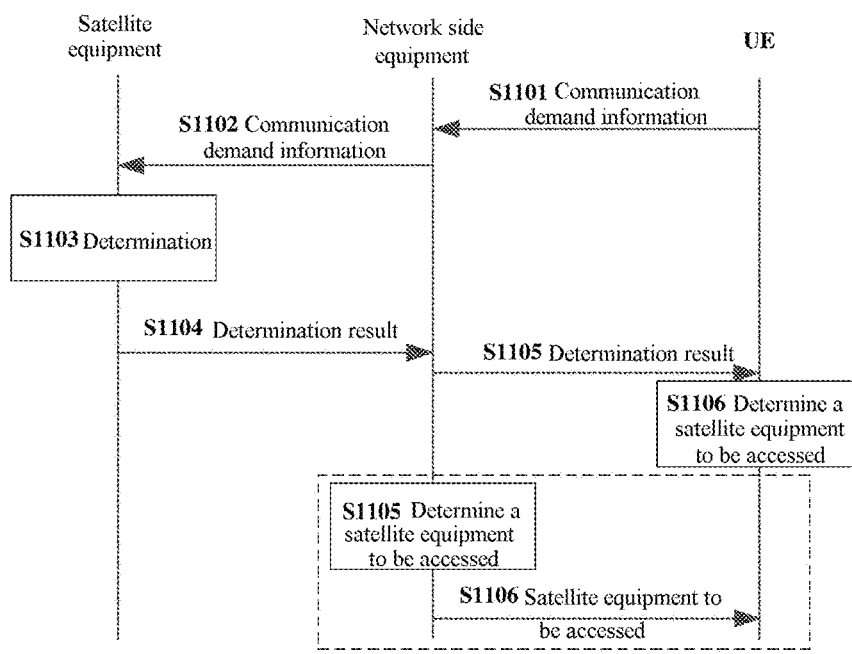
FIG. 11(b) is a flowchart showing signaling for selecting a satellite equipment for a UE according to another embodiment of the present disclosure.
Figure 11C:
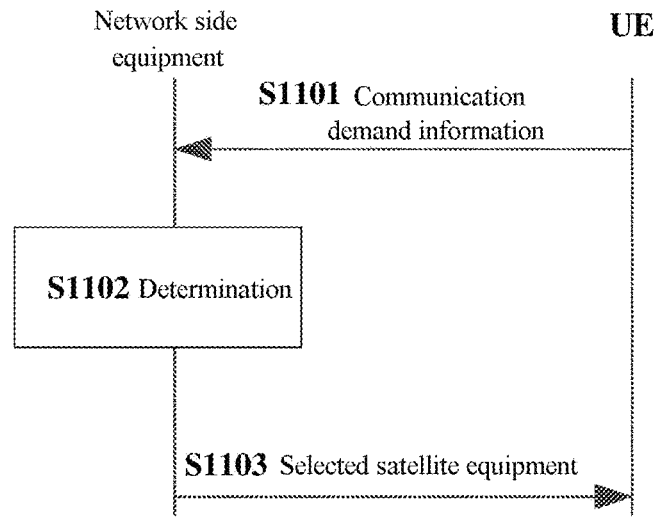
FIG. 11(c) is a flowchart showing signaling for selecting a satellite equipment for a UE according to another embodiment of the present disclosure.

FIG. 11(a) to FIG. 11(c) each is a flowchart showing signaling for selecting a satellite equipment for a UE according to an embodiment of the present disclosure.

As shown in FIG. 11(a), in step S1101, a UE sends information related to a communication demand to a network side equipment. Next, in step S1102, the network side equipment sends the information related to the communication demand to a satellite equipment. Next, in step S1103, a satellite equipment that receives the information related to the communication demand performs determination. Next, in step S1104, the satellite equipment sends a determination result to the UE. Next, in step S1105, the UE determines a satellite equipment to be accessed based on the received determination result.

As shown in FIG. 11(b), in step S1101, a UE sends information related to a communication demand to a network side equipment. Next, in step S1102, the network side equipment sends the information related to the communication demand to a satellite equipment. Next, in step S1103, a satellite equipment that receives the information related to the communication demand performs determination. Next, in step S1104, the satellite equipment sends a determination result to the network side equipment. Next, in step S1105, the network side equipment sends a determination results from one or more satellite equipments to the UE. Next, in step S1106, the UE determines a satellite equipment to be accessed based on the determination result. Alternatively, in step S1105, the network side equipment determines a satellite equipment that the UE is to access based on the determination result from one or more satellite equipments. Next, in step S1106, the network side equipment sends identity information of the satellite equipment that the UE is to access to the UE.

As shown in FIG. 11(c), in step S1101, a UE sends information related to a communication demand to a network side equipment. Next, in step S1102, the network side equipment selects a satellite equipment that the UE is to access. Next, in step S1103, the network side equipment sends identity information of the satellite equipment that the UE is to access to the UE.

As described above, the network side equipment may determine a satellite equipment that the UE is to access in an initial access process, that is, before the UE accesses a satellite equipment. In this way, the UE is not required to exchange information of determination result with all satellite equipments, thereby avoiding time delay and power loss.

According to an embodiment of the present disclosure, the control information may further include information related to the satellite equipment that the user equipment is to access, including a satellite equipment to which the user equipment is to switch. The configuring unit 320 may configure the control information including the satellite equipment to which the user equipment is to switch.

According to an embodiment of the present disclosure, the communicating unit 310 may send, to the user equipment, switching instruction information representing switching a satellite equipment currently accessed by the user equipment to another satellite equipment.

According to an embodiment of the present disclosure, the switching may be performed by the user equipment or the electronic equipment 300. For example, in an embodiment in which the user equipment performs the switching, when determining that channel quality between the user equipment and the satellite equipment is poor, the user equipment may be determined to switch from the satellite equipment currently accessed to another satellite equipment. For another example, in an embodiment in which the electronic equipment 300 performs the switching, the electronic equipment 300 may determine, based on a distance between the user equipment and the satellite equipment currently accessed, that the user equipment is required to switch from the satellite equipment currently accessed to another satellite equipment. For example, in a case that the distance between the user equipment and the satellite equipment currently accessed is far, the electronic equipment 300 may determine that the user equipment is required to switch to another satellite equipment.

According to an embodiment of the present disclosure, the another satellite equipment to which the user equipment is to switch may be determined by the satellite equipment currently accessed by the user equipment or may be determined by the electronic equipment 300.

According to an embodiment of the present disclosure, the communicating unit 310 may receive channel quality information between the user equipment and each of multiple satellite equipments from the user equipment. That is, the user equipment may calculate channel quality between the user equipment and each of the multiple satellite equipments around the user equipment and send the channel quality information to the electronic equipment 300.

Further, in a case that the satellite equipment currently accessed by the user equipment determines a satellite equipment to which the user equipment is to switch, the electronic equipment 300 may send received channel quality information to the satellite equipment currently accessed by the user equipment, such that the satellite equipment selects, based on the channel quality information, a satellite equipment to which the user equipment is to switch. In this case, the communicating unit 310 may receive the switching instruction information from the satellite equipment currently accessed by the user equipment. The switching instruction information may include identity information of another satellite equipment to which it is required to switch. In addition, the satellite equipment currently accessed may further directly send the switching instruction information to the user equipment.

According to an embodiment of the present disclosure, the selecting unit 350 may further determine another satellite equipment to which the user equipment is to switch based on the channel quality information between the user equipment and each of the multiple satellite equipments. In this case, the configuring unit 350 may configure the control information including the switching instruction information, which includes the identity information of the another satellite equipment to which the user equipment is to switch.

Figure 12A:
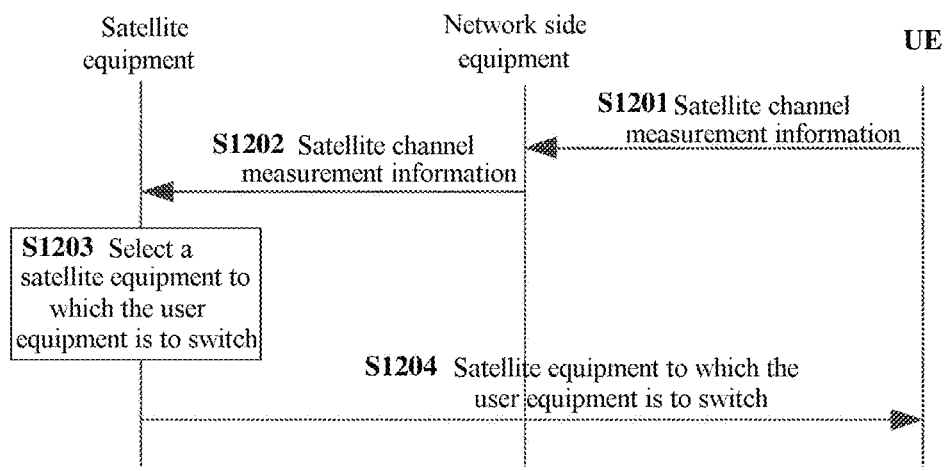
FIG. 12(a) is a flowchart showing signaling for switching a satellite equipment of a UE according to an embodiment of the present disclosure.
Figure 12B:
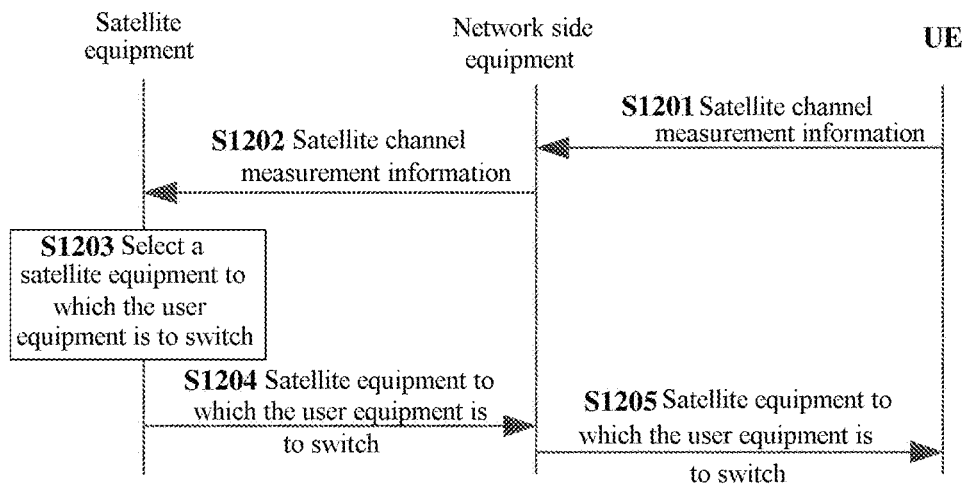
FIG. 12(b) is a flowchart showing signaling for switching a satellite equipment of a UE according to another embodiment of the present disclosure.
Figure 12C:
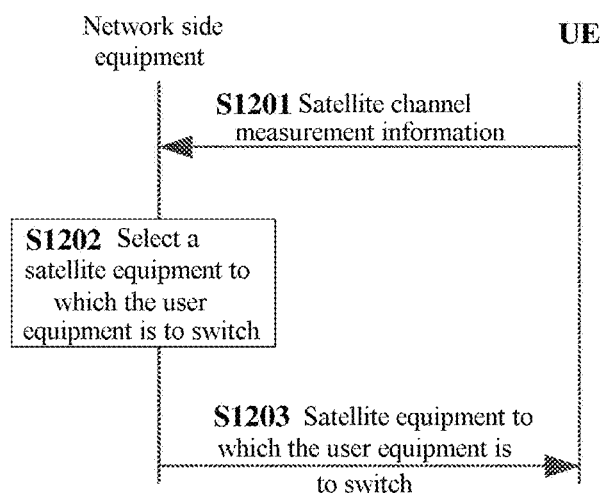
FIG. 12(c) is a flowchart showing signaling for switching a satellite equipment of a UE according to another embodiment of the present disclosure.

FIG. 12(a) to FIG. 12(c) each is a flowchart showing signaling for switching a satellite equipment for a UE according to an embodiment of the present disclosure.

As shown in FIG. 12(a), in step S1201, a UE sends measured channel quality information between the user equipment and each of multiple satellite equipments to the network side equipment. Next, in step S1202, the network side equipment sends the channel quality information to a satellite equipment currently accessed by the user equipment. Next, in step S1203, the satellite equipment currently accessed by the user equipment selects a satellite equipment to which the user equipment is to switch. Next, in step S1204, the satellite equipment directly sends, to the UE, identity of the satellite equipment to which the user equipment is to switch.

As shown in FIG. 12(b), in step S1201, a UE sends measured channel quality information between the UE and each of multiple satellite equipments to a network side equipment. Next, in step S1202, the network side equipment sends the channel quality information to a satellite equipment currently accessed by the user equipment. Next, in step S1203, the satellite equipment currently accessed by the user equipment selects a satellite equipment to which the user equipment is to switch. Next, in step S1204, the satellite equipment sends, to the network side equipment, identity of the satellite equipment to which the user equipment is to switch. Next, in step S1205, the network side equipment sends the identity information of the switched satellite equipment to the UE.

As shown in FIG. 12(c), in step S1201, a UE sends measured channel quality information between the UE and each of multiple satellite equipments to a network side equipment. Next, in step S1202, the network side equipment selects a satellite equipment to which the UE is to switch. Next, in step S1203, the network side equipment sends, to the UE, identity information of the satellite equipment to which the user equipment is to switch.

According to an embodiment of the present disclosure, the electronic equipment 300 may send switching instruction information by resources different from those used by the satellite equipment currently accessed. The resources may include time resources and frequency resources.

As described above, when accessing a satellite equipment, the UE may determine a satellite equipment to which the user equipment is to switch via the network side equipment, thereby avoiding time delay and power loss.

It can be seen that, the electronic equipment 300 according to the embodiment of the present disclosure may configure control information related to data transmission between the user equipment and the satellite equipment and send the configured control information to the user equipment. The control information includes but is not limited to these kinds of control information described above. It should be noted that, the electronic equipment 300 may assist the user equipment in acquiring any control information related to data transmission between the user equipment and the satellite equipment, thereby preventing the user equipment from acquiring control information from the satellite equipment with large transmission power and large time delay. In addition, the electronic equipment 300 may assist multiple user equipments in acquiring the control information, thereby avoiding redundant acquisition.

3. Configuration Example for a User Equipment

Figure 13:
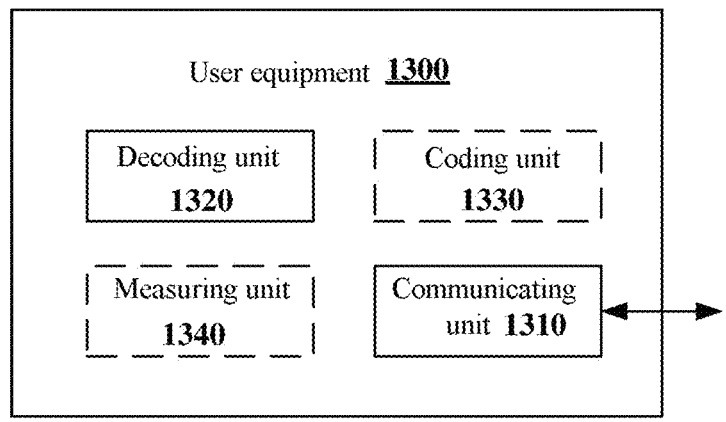
FIG. 13 is a block diagram showing a configuration example of a user equipment according to an embodiment of the present disclosure.

FIG. 13 is a block diagram showing a structure of a user equipment 1300 in a wireless communication system according to an embodiment of the present disclosure. As shown in FIG. 13, the user equipment 1300 may include a communicating unit 1310 and a decoding unit 1320.

Here, units of the user equipment 1300 may be included in processing circuitry. It should be noted that the user equipment 1300 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to an embodiment of the present disclosure, the user equipment 1300 may receive control information related to data transmission between the user equipment and the satellite equipment via the communicating unit 1310.

According to an embodiment of the present disclosure, the decoding unit 1320 may decode received control information, such that the user equipment 1300 may perform data transmission with the satellite equipment based on the decoded control information.

Preferably, the control information includes a physical layer parameter related to data transmission between the user equipment and the satellite equipment. The physical layer parameter includes but is not limited to uplink transmission power for the user equipment, a Time Advance (TA) for the user equipment, a Modulation and Coding Scheme (MCS) for the user equipment and uplink resources for the user equipment.

Preferably, the control information may further include information related to a satellite equipment that the user equipment is to access, which includes but is not limited to a satellite equipment initially accessed by the user equipment and a satellite equipment to which the user equipment is to switch.

Here, the user equipment 1300 may receive the control information from the network side equipment, for example, the electronic equipment 300 as described above. Here the network side equipment may serve the user equipment 1300.

According to an embodiment of the present disclosure, the user equipment 1300 may send a random access request message of desiring to access a satellite equipment to a network side equipment and receive a time advance between the user equipment and a satellite equipment that the user equipment is to access from the network side equipment.

According to an embodiment of the present disclosure, as shown in FIG. 13, the user equipment 1300 may further include a coding unit 1330 configured to select a proper random access code and code the random access code to generate a random access request message. Here, the coding unit 1330 may select a random access code representing that the user equipment desires to access a satellite equipment. According to an embodiment of the present disclosure, there may be multiple kinds of access codes at a side of the user equipment. Different kinds of access codes have different meanings. For example, there may be the random access code representing that the user equipment desires to access a satellite equipment and a random access code representing that the user equipment desires to access a base station equipment at the side of the user equipment. In addition, the random access code representing that the user equipment desires to access a base station equipment may include a random access code representing that the user equipment is located at an edge of a cell, a random access code representing that the user equipment is located at a center of a cell and the like. The network side equipment may determine whether the user equipment 1300 desires to access the satellite equipment or the network side equipment by decoding the random access code.

According to an embodiment of the present disclosure, the user equipment 1300 may receive the time advance by a random access response message.

According to an embodiment of the present disclosure, the user equipment 1300 may receive an updated time advance from the network side equipment before each uplink transmission of the user equipment 1300 or when the user equipment 1300 is in a desynchronizing state.

According to an embodiment of the present disclosure, the user equipment 1300 may send information related to a communication demand to the network side equipment and receive information on a satellite equipment that the user equipment is to access from the network side equipment or the satellite equipment that the user equipment 1300 is to access.

According to an embodiment of the present disclosure, the user equipment 1300 may receive switching instruction information representing switching a satellite equipment currently accessed to another satellite equipment from the network side equipment or the satellite equipment that the user equipment 1300 is to access.

According to an embodiment of the present disclosure, as shown in FIG. 13, the user equipment 1300 may further include a measuring unit 1340 configured to measure channel quality information between the user equipment and the satellite equipment. Further, the user equipment 1300 may send channel quality information between the user equipment and each of multiple satellite equipments to the network side equipment, such that the network side equipment or the satellite equipment currently accessed determines another satellite equipment to which the user equipment is to switch according to the channel quality information between the user equipment 1300 and each of the multiple satellite equipments.

According to an embodiment of the present disclosure, the user equipment 1300 may send buffer status report information to the network side equipment and receive uplink resource information for the user equipment from the network side equipment or a satellite equipment currently accessed by the user equipment.

According to an embodiment of the present disclosure, the user equipment 1300 may receive uplink transmission power information from the network side equipment before each uplink transmission of the user equipment 1300.

According to an embodiment of the present disclosure, the user equipment 1300 may send uplink transmission power request information to the network side equipment, such that the network side equipment determines uplink transmission power for the user equipment 1300 in response to the power request information.

The electronic equipment 300 according to the embodiment of the present disclosure may serve as a network side equipment. That is, the electronic equipment 300 may serve the user equipment 1300. Therefore, all embodiments of the electronic equipment 300 described above are applicable to the user equipment 1300.

4. Method Embodiment

Next, a wireless communication method performed by an electronic equipment 300 serving as a network side equipment in a wireless communication system according to an embodiment of the present disclosure is described in detail.

Figure 14:
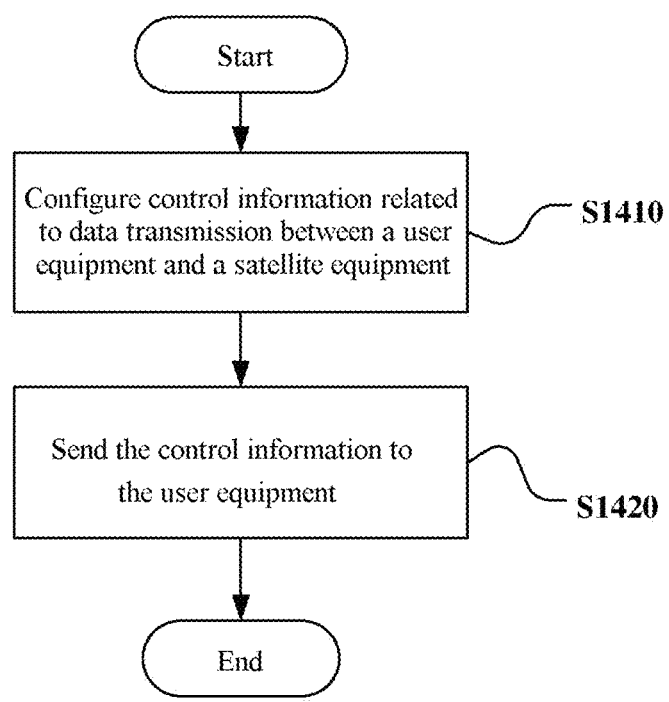
FIG. 14 is a flowchart of a wireless communication method performed by an electronic equipment according to an embodiment of the present disclosure.

FIG. 14 is a flowchart of the wireless communication method performed by the electronic equipment 300 serving as a network side equipment in a wireless communication system according to an embodiment of the present disclosure.

As shown in FIG. 14, in step S1410, control information related to data transmission between a user equipment and a satellite equipment is configured.

Next, in step S1420, the control information is sent to the user equipment.

Preferably, the control information includes a physical layer parameter related to data transmission between the user equipment and the satellite equipment. The physical layer parameter includes but is not limited to uplink transmission power for the user equipment, a time advance for the user equipment, a modulation and coding scheme for the user equipment and uplink resources for the user equipment.

Preferably, the control information may further include information related to a satellite equipment that the user equipment is to access, which includes but is not limited to a satellite equipment initially accessed by the user equipment and a satellite equipment to which the user equipment is to switch.

Preferably, the wireless communication method further includes: receiving a random access request message of desiring to access a satellite equipment from a user equipment; and sending a time advance between the user equipment and a satellite equipment to be accessed to the user equipment, in response to the random access request message.

Preferably, the random access request message includes a random access code representing that the user equipment desires to access a satellite equipment.

Preferably, the wireless communication method further includes: using the time advance between the electronic equipment and the satellite equipment to be accessed as a time advance between the user equipment and the satellite equipment to be accessed.

Preferably, the wireless communication method further includes: receiving a time advance between the electronic equipment and the satellite equipment to be accessed from the satellite equipment to be accessed.

Preferably, the wireless communication method further includes: calculating, according to a position of the satellite equipment to be accessed or current time information, the time advance between the electronic equipment and the satellite equipment to be accessed.

Preferably, the sending a time advance between the user equipment and a satellite equipment to be accessed to the user equipment includes: sending the time advance by a random access response message.

Preferably, the wireless communication method further includes: sending an updated time advance to the user equipment, before each uplink transmission of the user equipment or when the user equipment is in a desynchronizing state.

Preferably, the sending a time advance between the user equipment and a satellite equipment to be accessed to the user equipment includes: sending the time advance by resources different from those used by the satellite equipment to be accessed.

Preferably, the sending a time advance between the user equipment and a satellite equipment to be accessed to the user equipment includes: sending the time advance by time resources different from those used by the satellite equipment to be accessed or by frequency resources different from those used by the satellite equipment to be accessed.

Preferably, the wireless communication method further includes: receiving information related to a communication demand from the user equipment; and sending information on a satellite equipment that the user equipment is to access to the user equipment, in response to the received information related to the communication demand.

Preferably, the wireless communication method further includes: selecting a satellite equipment that the user equipment is to access according to the information related to a communication demand.

Preferably, the wireless communication method further includes: sending, to the user equipment, switching instruction information representing switching a satellite equipment currently accessed by the user equipment to another satellite equipment.

Preferably, the wireless communication method further includes: determining, according to a distance between the user equipment and the satellite equipment currently accessed, that the user equipment switches from the satellite equipment currently accessed to another satellite equipment.

Preferably, the wireless communication method further includes: receiving the switching instruction information from the satellite equipment currently accessed.

Preferably, the wireless communication method further includes: receiving, from the user equipment, channel quality information between the user equipment and each of multiple satellite equipments; and determining, according to the channel quality information between the user equipment and each of the multiple satellite equipments, another satellite equipment to which the user equipment is to switch.

Preferably, the wireless communication method further includes: receiving buffer status report information from the user equipment and sending the buffer status report information to a satellite equipment currently accessed by the user equipment; and receiving uplink resource information for the user equipment from the satellite equipment currently accessed by the user equipment and sending the uplink resource information to the user equipment.

Preferably, the wireless communication method further includes: merging buffer status report information from multiple user equipments that currently access one satellite equipment and sending the merged information to the satellite equipment currently accessed.

Preferably, the wireless communication method further includes: receiving, from the satellite equipment currently accessed by the user equipment, merged uplink resource information for multiple user equipments; and determining, according to the merged uplink resource information, uplink resource information for each of the multiple user equipments.

Preferably, the sending the uplink resource information to the user equipment includes: sending the uplink resource information by resources different from those used by the satellite equipment currently accessed.

Preferably, the sending the uplink resource information to the user equipment includes: sending the uplink resource information by time resources different from those used by the satellite equipment currently accessed or by frequency resources different from those used by the satellite equipment currently accessed.

Preferably, the wireless communication method further includes: sending uplink transmission power information to the user equipment before each uplink transmission of the user equipment.

Preferably, the wireless communication method further includes: receiving uplink transmission power request information from the user equipment.

Preferably, the wireless communication method further includes: using uplink transmission power information for uplink transmission between the electronic equipment and the satellite equipment currently accessed by the user equipment, as the uplink transmission power information for the user equipment.

Preferably, the wireless communication method further includes: receiving, from the satellite equipment currently accessed, the uplink transmission power information for the electronic equipment.

Preferably, the wireless communication method further includes: calculating, according to a position of the satellite equipment currently accessed or current time information, uplink transmission power information for the electronic equipment.

Preferably, the sending uplink transmission power information to the user equipment includes: sending the uplink transmission power information by resources different from those used by the satellite equipment currently accessed.

Preferably, the sending uplink transmission power information to the user equipment includes: sending the uplink transmission power information by time resources different from those used by the satellite equipment currently accessed or by frequency resources different from those used by the satellite equipment currently accessed.

According to an embodiment of the present disclosure, the above method may be performed by the electronic equipment 300 according to the embodiment of the present disclosure. Therefore, all embodiments of the electronic equipment 300 described above are applicable to this method.

Next, a wireless communication method performed by a user equipment 1300 in a wireless communication system according to an embodiment of the present disclosure is described in detail.

Figure 15:
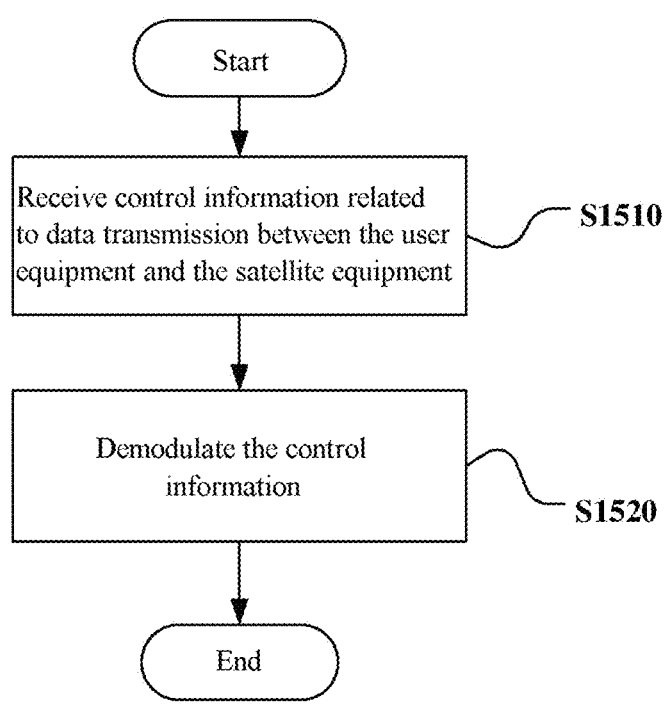
FIG. 15 is a flowchart of a wireless communication method performed by a user equipment according to an embodiment of the present disclosure.

FIG. 15 is a flowchart of a wireless communication method performed by the user equipment 1300 in a wireless communication system according to an embodiment of the present disclosure.

As shown in FIG. 15, in step S1510, control information of data transmission between a user equipment and a satellite equipment is received.

Next, in step S1520, the received control information is demodulated so as to perform data transmission between the user equipment and the satellite equipment based on the control information.

Preferably, the wireless communication method further includes: sending, to a network side equipment, a random access request message of desiring to access a satellite equipment; and receiving, from the network side equipment, a time advance between the user equipment and a satellite equipment that the user equipment is to access.

Preferably, the random access request message includes a random access code representing that the user equipment desires to access a satellite equipment.

Preferably, the receiving, from the network side equipment, a time advance includes: receiving the time advance by a random access response message.

Preferably, the wireless communication method further includes: receiving an updated time advance from the network side equipment, before each uplink transmission of the user equipment or when the user equipment is in a desynchronizing state.

Preferably, the wireless communication method further includes: sending, to the network side equipment, information related to a communication demand; and receiving, from the network side equipment or a satellite equipment that the user equipment is to access, information on the satellite equipment that the user equipment is to access.

Preferably, the wireless communication method further includes: receiving, from the network side equipment or a satellite equipment currently accessed by the user equipment, switching instruction information representing switching the satellite equipment currently accessed to another satellite equipment.

Preferably, the wireless communication method further includes: sending channel quality information between the user equipment and each of multiple satellite equipments to the network side equipment, such that the network side equipment or the satellite equipment currently accessed determines another satellite equipment to which the user equipment is to switch according to the channel quality information between the user equipment and each of the multiple satellite equipment.

Preferably, the wireless communication method further includes: sending buffer status report information to the network side equipment and receiving uplink resource information for the user equipment from the network side equipment or a satellite equipment currently accessed by the user equipment.

Preferably, the wireless communication method further includes: receiving uplink transmission power information from the network side equipment before each uplink transmission of the user equipment.

Preferably, the wireless communication method further includes: sending uplink transmission power request information to the network side equipment.

According to an embodiment of the present disclosure, the above method may be performed by the user equipment 1300 according to the embodiment of the present disclosure. Therefore, all embodiments of the user equipment 1300 described above are applicable to this method.

5. Application Example

The technology according to the present disclosure may be applicable to various productions.

The network side equipment according to the present disclosure may be a network side equipment having a function of transmitting and receiving on the ground. For example, the network side equipment may be a transceiver on the ground. In this case, the network side equipment may be a transmitting-receiving equipment specifically for assisting the UE in acquiring control information related to data communications between the UE and the satellite equipment. That is, multiple transmitting-receiving equipments may be arranged on the ground based on geographic positions. Each of the multiple transmitting-receiving equipments may assist a UE in a certain range around the transmitting-receiving equipment in acquiring control information related to data communications between the UE and the satellite equipment. In addition, the network side equipment may also be, for example, a TRP or a base station equipment. The TRP may have a function of transmitting and receiving. For example, the TRP may receive information from a user equipment and a base station equipment and may further send information to a user equipment and a base station equipment. In an example, the TRP may serve a user equipment and may be controlled by a base station equipment. That is, the base station equipment serves the user equipment via the TRP. The base station equipment, for example, may be an eNB or a gNB (a base station in a fifth generation communication system). Further, the network side equipment may have a structure similar to that of a base station equipment described below or only have a structure related to information sending and receiving in the base station equipment.

The network side equipment may be implemented as any types of base station equipment, such as a macro eNB and a small eNB. The network side equipment may further be implemented as any types of gNB (a base station in a 5G system). The small eNB may be an eNB of a cell having a smaller coverage than a macro cell, such as a pico eNB, a micro eNB and a home (femto) eNB. Alternatively, the base station may be implemented as any other types of base stations, such as a NodeB and a base transceiver station (BTS). The base station may include: a main body (also referred to as a base station equipment) configured to control the wireless communication; and one or more remote radio heads (RRH) arranged at a different position from the main body.

The user equipment may be implemented as a mobile terminal (such as a smartphone, a tablet personal computer (PC), a notebook PC, a portable game terminal, a portable/dongle mobile router and a digital camera) or a vehicle terminal (such as a vehicle navigation equipment). The user equipment may further be implemented as a terminal performing machine to machine (M2M) communications (which is also referred to as a machine type communication (MTC) terminal). In addition, the user equipment may further be a wireless communication module (such as an integrated circuitry module including one wafer) mounted on each of the above terminals.

Application Example for a Base Station

First Application Example

Figure 16:
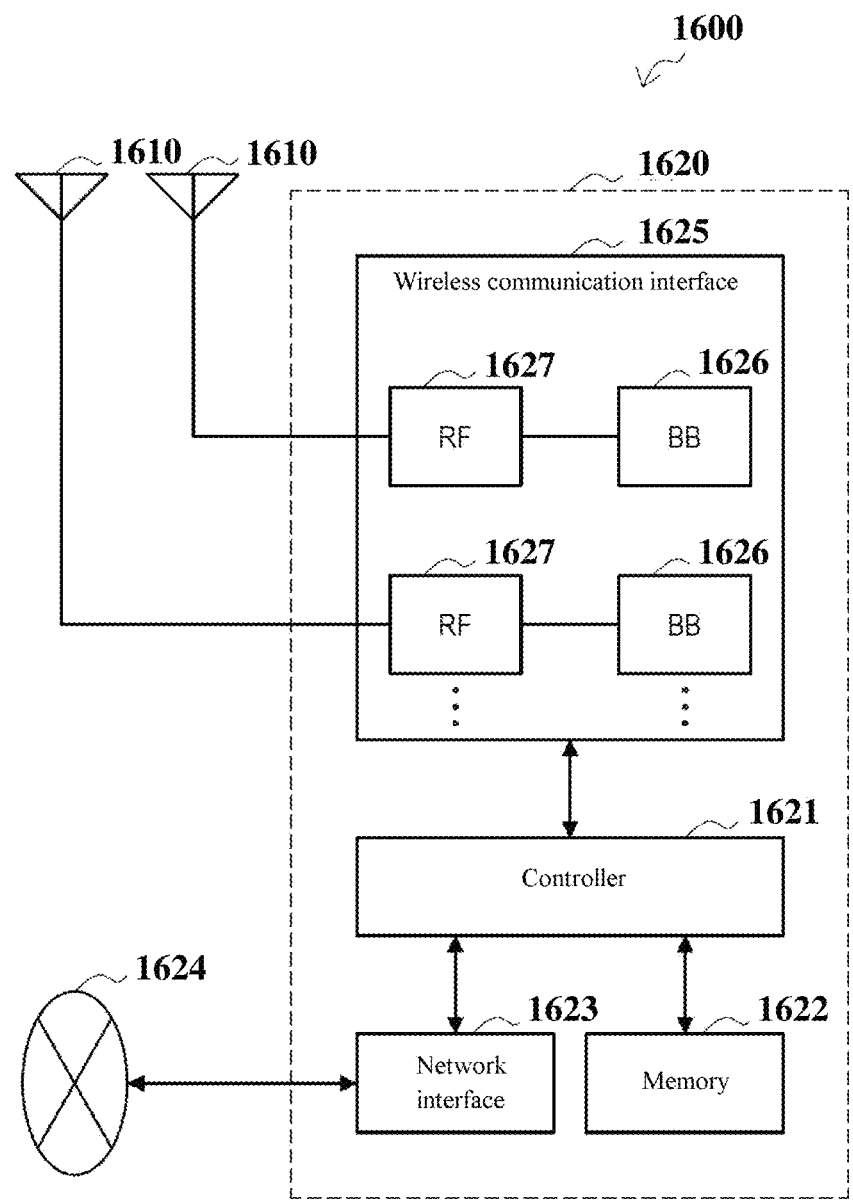
FIG. 16 is a block diagram showing a first example of exemplary configuration of an eNB (Evolved Node B)

FIG. 16 is a block diagram showing a first example of exemplary configuration of an eNB to which technology according to the present disclosure may be applied. An eNB 1600 includes one or more antennas 1610 and a base station equipment 1620. Each of the antennas 1610 is connected to the base station equipment 1620 via a radio frequency (RF) cable.

Each of the antennas 1610 includes a single antenna element or multiple antenna elements (such as multiple antenna elements included in a multiple-input multiple-output (MIMO) antenna), and is used for the base station equipment 1620 to send and receive a wireless signal. The eNB 1600 may include multiple antennas 1610, as shown in FIG. 16. For example, the multiple antennas 1610 may be compatible with multiple frequency bands used by the eNB 1600. Although FIG. 16 shows an example in which the eNB 1600 includes the multiple antennas 1610, the eNB 1600 may also include a single antenna 1610.

The base station equipment 1620 includes a controller 1621, a memory 1622, a network interface 1623 and a wireless communication interface 1625.

The controller 1621 may be, for example, a CPU or a DSP, and operate various functions of a high layer of the base station equipment 1620. For example, the controller 1621 generates a data packet based on data in a signal processed by the wireless communication interface 1625 and sends the generated packet via the network interface 1623. The controller 1621 may bundle data from multiple baseband processors to generate a bundled packet and send the generated bundled packet. The controller 1621 may have a logic function that performs control such as wireless resource control, wireless bearer control, mobility management, admission control, and scheduling. The control may be performed in combination with a nearby eNB or core network node. The memory 1622 includes an RAM and an ROM, and stores a program executed by the controller 1621 and various types of control data (such as a terminal list, transmission power data and scheduling data).

The network interface 1623 is a communication interface via which the base station equipment 1620 is connected to a core network 1624. The controller 1621 may communicate with a core network node or another eNB via the network interface 1623. In this case, the eNB 1600 may be connected to the core network node or another eNB via a logical interface (such as an interface S1 and an interface X2). The network interface 1623 may also be a wired communication interface or a wireless communication interface for wireless backhaul line. If the network interface 1623 is the wireless communication interface, the network interface 1623 may use a frequency band for wireless communication higher than a frequency band used by the wireless communication interface 1625.

The wireless communication interface 1625 supports any cellular communication scheme (such as long term evolution (LTE) and LTE-Advanced), and provides wireless connection to a terminal positioned in a cell of the eNB 1600 via an antenna 1610. The wireless communication interface 1625 may include, for example, a (base band) BB processor 1626 and RF circuitry 1627. The BB processor 1626 may perform, for example, encoding/decoding, modulating/demodulating and multiplexing/de-multiplexing, and various types of signal processing of layers (such as L1, medium access control (MAC), radio link control (RLC) and packet data convergence protocol (PDCP)). Instead of the controller 1621, the BB processor 1626 may have a part or all of the above logic functions. The BB processor 1626 may be implemented as a memory storing a communication control program, or a module including a processor configured to execute a program and related circuitry. The function of the BB processor 1626 may be changed by updating the program. The module may be a card or blade inserted into a slot of the base station equipment 1620. Alternatively, the module may be a chip mounted on the card or the blade. Further, the RF circuitry 1627 may include, for example, a mixer, a filter or an amplifier, and sends and receives a wireless signal via the antenna 1610.

As shown in FIG. 16, the wireless communication interface 1625 may include multiple BB processors 1626. For example, the multiple BB processors 1626 may be compatible with multiple frequency bands used by the eNB 1600. As shown in FIG. 16, the wireless communication interface 1625 may include multiple RF circuitry 1627. For example, the multiple RF circuitry 1627 may be compatible with multiple antenna elements. Although FIG. 16 shows an example in which the wireless communication interface 1625 includes multiple BB processors 1626 and multiple RF circuitry 1627, the wireless communication interface 1625 may include a single BB processor 1626 or single RF circuitry 1627.

Second Application Example

Figure 17:
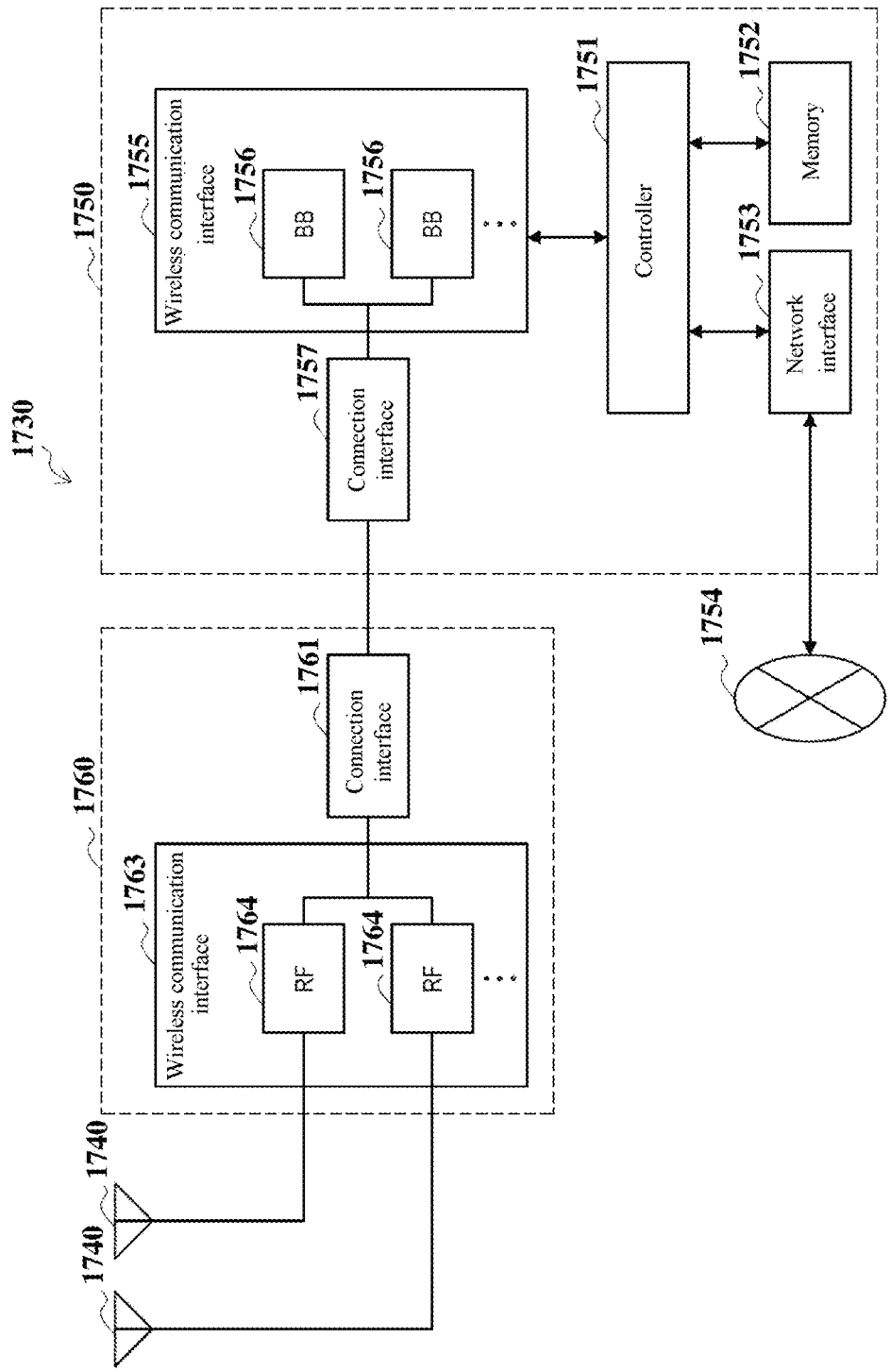
FIG. 17 is a block diagram showing a second example of the exemplary configuration of the eNB.

FIG. 17 is a block diagram showing a second example of the exemplary configuration of an eNB to which the technology of the present disclosure may be applied. An eNB 1730 includes one or more antennas 1740, a base station equipment 1750 and an RRH 1760. The RRH 1760 may be connected to each of the antennas 1740 via an RF cable. The base station equipment 1750 may be connected to the RRH 1760 via a high speed line such as an optical fiber cable.

Each of the antennas 1740 includes a single antenna element or multiple antenna elements (such as multiple antenna elements included in a MIMO antenna), and is used for the RRH 1760 to send and receive a wireless signal. As shown in FIG. 17, the eNB 1730 may include multiple antennas 1740. For example, the multiple antennas 1740 may be compatible with multiple frequency bands used by the eNB 1730. Although FIG. 17 shows an example in which the eNB 1730 includes the multiple antennas 1740, the eNB 1730 may also include a single antenna 1740.

The base station equipment 1750 includes a controller 1751, a memory 1752, a network interface 1753, a wireless communication interface 1755, and a connection interface 1757. The controller 1751, the memory 1752, and the network interface 1753 are respectively the same as the controller 1621, the memory 1622, and the network interface 1623 described with reference to FIG. 16.

The wireless communication interface 1755 supports any cellular communication schemes (such as LTE and LTE-advanced), and provides wireless communication with a terminal located in a sector corresponding to the RRH 1760 via the RRH 1760 and the antenna 1740. The wireless communication interface 1755 may generally include, for example, a BB processor 1756. Except for the BB processor 1756 being connected to RF circuitry 1764 of the RRH 1760 via the connection interface 1757, the BB processor 1756 is the same as the BB processor 1626 described with reference to FIG. 16. The wireless communication interface 1755 may include multiple BB processors 1756, as shown in FIG. 17. For example, the multiple BB processors 1756 may be compatible with multiple frequency bands used by the eNB 1730. Although FIG. 17 shows an example in which the wireless communication interface 1755 includes multiple BB processors 1756, the wireless communication interface 1755 may also include a single BB processor 1756.

The connection interface 1757 is an interface for connecting the base station equipment 1750 (the wireless communication interface 1755) to the RRH 1760. The connection interface 1757 may also be a communication module for communication in the above high speed line that connects the base station equipment 1750 (the wireless communication interface 1755) to the RRH 1760.

The RRH 1760 includes a connection interface 1761 and a wireless communication interface 1763.

The connection interface 1761 is an interface for connecting the RRH 1760 (the wireless communication interface 1763) to the base station equipment 1750. The connection interface 1761 may also be a communication module for communication in the above-described high speed line.

The wireless communication interface 1763 sends and receives a wireless signal via the antenna 1740. The wireless communication interface 1763 may generally include, for example, the RF circuitry 1764. The RF circuitry 1764 may include, for example, a mixer, a filter, and an amplifier, and sends and receives a wireless signal via the antenna 1740. The wireless communication interface 1763 may include multiple RF circuitry 1764, as shown in FIG. 17. For example, the multiple RF circuitry 1764 may support multiple antenna elements. Although FIG. 17 shows an example in which the wireless communication interface 1763 includes the multiple RF circuitry 1764, the wireless communication interface 1763 may also include single RF circuitry 1764.

In the eNB 1600 and the eNB 1730 respectively shown in FIG. 16 and FIG. 17, the configuring unit 320, the decoding unit 330, the storing unit 340 and the selecting unit 350 shown in FIG. 3 may be implemented by the controller 1621 and/or the controller 1751. At least a part of functions may also be implemented by the controller 1621 and the controller 1751. For example, the controller 1621 and/or the controller 1751 may configure control information, decode the random access code and select the satellite equipment by executing instructions stored in a corresponding memory.

Application Example for a Terminal Equipment

First Application Example

Figure 18:
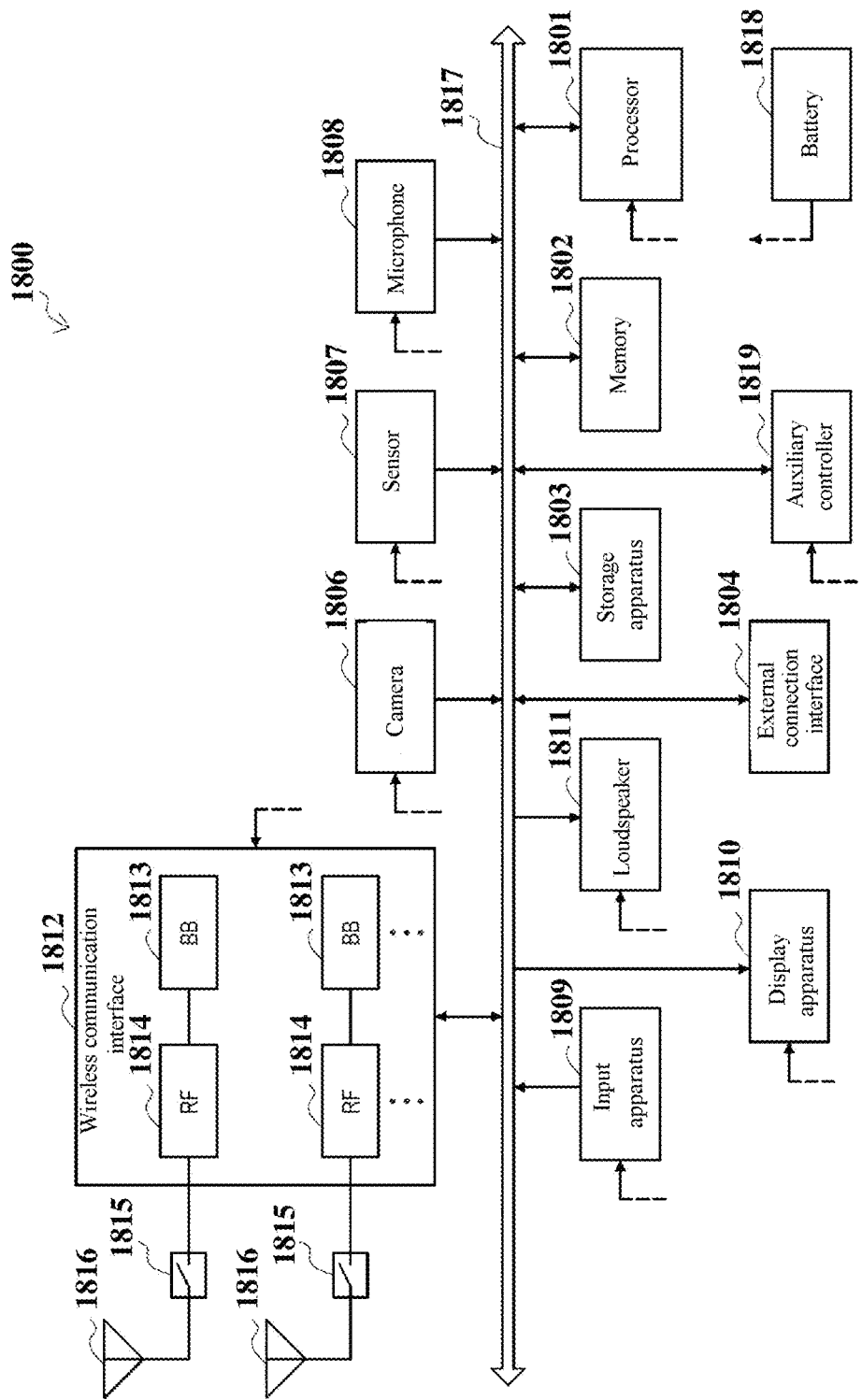
FIG. 18 is a block diagram showing exemplary configuration of a smartphone.

FIG. 18 is a block diagram showing an exemplary configuration of a smartphone 1800 to which technology according to the present disclosure may be applied. The smartphone 1800 includes a processor 1801, a memory 1802, a storage apparatus 1803, an external connection interface 1804, a camera 1806, a sensor 1807, a microphone 1808, an input apparatus 1809, a display apparatus 1810, a loudspeaker 1811, a wireless communication interface 1812, one or more antenna switches 1815, one or more antennas 1816, a bus 1817, a battery 1818 and an auxiliary controller 1819.

The processor 1801 may be, for example, a CPU or a system on chip (SoC), and controls functions of an application layer and another layer of the smartphone 1800. The memory 1802 includes an RAM and an ROM, and stores data and a program executed by the processor 1801. The storage apparatus 1803 may include a storage medium such as a semiconductor memory and a hard disk. The external connection interface 1804 is an interface for connecting an external apparatus (such as a memory card and a universal serial bus (USB) apparatus) to the smartphone 1800.

The camera 1806 includes an image sensor (such as a charge coupled device (CCD) and a complementary metal oxide semiconductor (CMOS)), and generates a captured image. The sensor 1807 may include a group of sensors such as a measurement sensor, a gyro sensor, a geomagnetic sensor, and an acceleration sensor. The microphone 1808 converts sound inputted to the smartphone 1800 into an audio signal. The input apparatus 1809 includes, for example, a touch sensor configured to detect a touch on a screen of the display apparatus 1810, a keypad, a keyboard, a button, or a switch, and receives an operation or information inputted from a user. The display apparatus 1810 includes a screen (such as a liquid crystal display (LCD) and an organic light-emitting diode (OLED) display), and displays an output image of the smartphone 1800. The loudspeaker 1811 is configured to convert an audio signal outputted from the smartphone 1800 into sound.

The wireless communication interface 1812 supports any cellular communication scheme (such as LTE and LTE-Advanced), and performs wireless communications. The wireless communication interface 1812 may include, for example, a BB processor 1813 and RF circuitry 1814. The BB processor 1813 may perform, for example, coding/decoding, modulating/demodulating and multiplexing/de-multiplexing, and perform various types of signal processing for wireless communications. The RF circuitry 1814 may include, for example, a mixer, a filter and an amplifier, and sends and receives a wireless signal via an antenna 1816. The wireless communication interface 1812 may be a chip module having the BB processor 1813 and the RF circuitry 1814 integrated thereon. As shown in FIG. 18, the wireless communication interface 1812 may include multiple BB processors 1813 and multiple RF circuitry 1814. Although FIG. 18 shows an example in which the wireless communication interface 1812 includes the multiple BB processors 1813 and the multiple RF circuitry 1814, the wireless communication interface 1812 may include a single BB processor 1813 or single RF circuitry 1814.

Besides the cellular communication scheme, the wireless communication interface 1812 may support an additional type of wireless communication scheme, such as a short-distance wireless communication scheme, a near field communication scheme and a wireless local area network (LAN) scheme. In this case, the wireless communication interface 1812 may include the BB processor 1813 and the RF circuitry 1814 for each wireless communication scheme.

Each of the antenna switches 1815 switches a connection destination of the antenna 1816 among multiple circuitry (such as circuitry for different wireless communication schemes) included in the wireless communication interface 1812.

Each of the antennas 1816 includes a single antenna element or multiple antenna elements (such as multiple antenna elements included in an MIMO antenna), and is used for the wireless communication interface 1812 to send and receive a wireless signal. The smartphone 1800 may include multiple antennas 1816, as shown in FIG. 18. Although FIG. 18 shows an example in which the smartphone 1800 includes the multiple antennas 1816, the smartphone 1800 may also include a single antenna 1816.

In addition, the smartphone 1800 may include an antenna 1816 for each type of wireless communication scheme. In this case, the antenna switches 1815 may be omitted from the configuration of the smartphone 1800.

The processor 1801, the memory 1802, the storage apparatus 1803, the external connection interface 1804, the camera 1806, the sensor 1807, the microphone 1808, the input apparatus 1809, the display apparatus 1810, the loudspeaker 1811, the wireless communication interface 1812, and the auxiliary controller 1819 are connected to each other via the bus 1817. The battery 1818 supplies power to blocks of the smartphone 1800 shown in FIG. 18 via feeders that are partially shown with dashed lines in the drawings. The auxiliary controller 1819, for example, operates a minimum necessary function of the smartphone 1800 in a sleep mode.

In the smartphone 1800 shown in FIG. 18, the decoding unit 1320, the coding unit 1330 and the measuring unit 1340 shown in FIG. 13 may be implemented by the processor 1801 or the auxiliary controller 1819. At least a part of functions may also be implemented by the processor 1801 or the auxiliary controller 1819. For example, the processor 1801 or the auxiliary controller 1819 may decode downlink information, code the random access code and calculate the channel quality by executing instructions stored in the memory 1802 or the storage apparatus 1803.

Second Application Example

Figure 19:
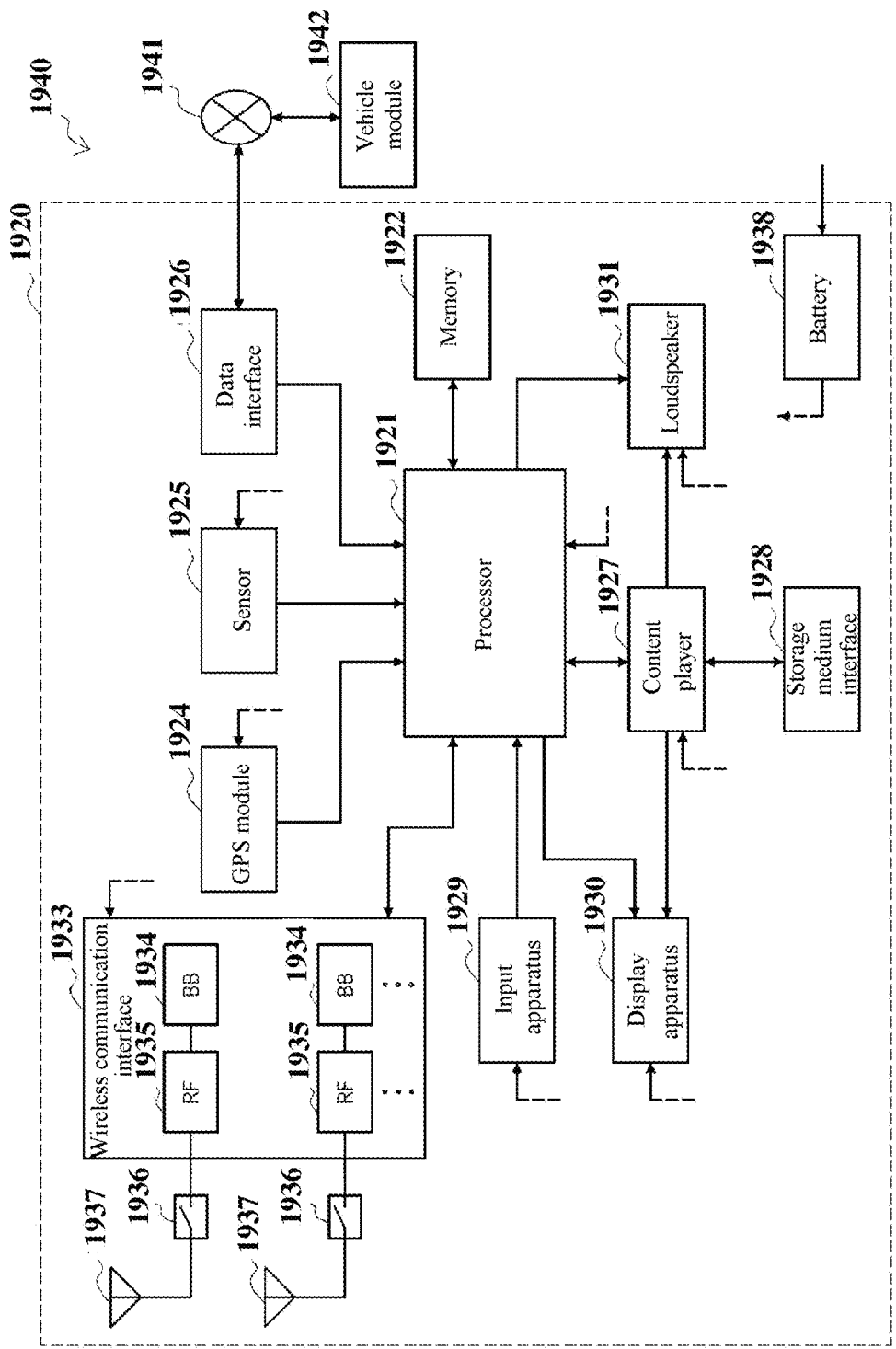
FIG. 19 is a block diagram showing exemplary configuration of a vehicle navigation equipment.

FIG. 19 is a block diagram showing an example of schematic configuration of a vehicle navigation equipment 1920 to which the technology according to the present disclosure may be applied. The vehicle navigation equipment 1920 includes a processor 1921, a memory 1922, a global positioning system (GPS) module 1924, a sensor 1925, a data interface 1926, a content player 1927, a storage medium interface 1928, an input apparatus 1929, a display apparatus 1930, a loudspeaker 1931, a wireless communication interface 1933, one or more antenna switches 1936, one or more antennas 1937, and a battery 1938.

The processor 1921 may be, for example, a CPU or a SoC, and controls a navigation function and another function of the vehicle navigation equipment 1920. The memory 1922 includes an RAM and an ROM, and stores a program executed by the processor 1921, and data.

The GPS module 1924 uses a GPS signal received from a GPS satellite to calculate a position (such as a latitude, a longitude, and an altitude) of the vehicle navigation equipment 1920. The sensor 1925 may include a group of sensors such as a gyro sensor, a geomagnetic sensor, and an air pressure sensor. The data interface 1926 is connected to, for example, a vehicle network 1941 via a terminal that is not shown, and acquires data (such as vehicle speed data) generated by the vehicle.

The content player 1927 reproduces content stored in a storage medium (such as a CD and a DVD) inserted into the storage medium interface 1928. The input apparatus 1929 includes, for example, a touch sensor configured to detect a touch on a screen of the display apparatus 1930, a button, or a switch, and receives an operation or information inputted by a user. The display apparatus 1930 includes a screen such as a LCD or an OLED display, and displays an image of the navigation function or reproduced content. The loudspeaker 1931 outputs sound of the navigation function or the reproduced content.

The wireless communication interface 1933 supports any cellular communication scheme (such as LTE and LTE-Advanced), and performs wireless communications. The wireless communication interface 1933 may generally include, for example, a BB processor 1934 and RF circuitry 1935. The BB processor 1934 may perform, for example, encoding/decoding, modulating/demodulating, and multiplexing/de-multiplexing, and performs various types of signal processing for wireless communications. In addition, the RF circuitry 1935 may include, for example, a mixer, a filter, and an amplifier, and sends and receives a wireless signal via the antenna 1937. The wireless communication interface 1933 may also be a chip module having the BB processor 1934 and the RF circuitry 1935 integrated thereon. The wireless communication interface 1933 may include multiple BB processors 1934 and multiple RF circuitry 1935, as shown in FIG. 19. Although FIG. 19 shows an example in which the wireless communication interface 1933 includes the multiple BB processors 1934 and the multiple RF circuitry 1935, the wireless communication interface 1933 may include a single BB processor 1934 or single RF circuitry 1935.

In addition to a cellular communication scheme, the wireless communication interface 1933 may support another type of wireless communication scheme such as a short-distance wireless communication scheme, a near field communication scheme, and a wireless LAN scheme. In that case, the wireless communication interface 1933 may include a BB processor 1934 and RF circuitry 1935 for each wireless communication scheme.

Each of the antenna switches 1936 switches a connection destination of the antenna 1937 among multiple circuitry (such as circuitry for different wireless communication schemes) included in the wireless communication interface 1933.

Each of the antennas 1937 includes a single antenna element or multiple antenna elements (such as multiple antenna elements included in an MIMO antenna), and is used for the wireless communication interface 1933 to send and receive a wireless signal. The vehicle navigation equipment 1920 may include multiple antennas 1937, as shown in FIG. 19. Although FIG. 19 shows an example in which the vehicle navigation equipment 1920 includes the multiple antennas 1937, the vehicle navigation equipment 1920 may include a single antenna 1937.

Furthermore, the vehicle navigation equipment 1920 may include an antenna 1937 for each wireless communication scheme. In that case, the antenna switches 1936 may be omitted from the configuration of the vehicle navigation equipment 1920.

The battery 1938 supplies power to blocks of the vehicle navigation equipment 1920 shown in FIG. 19 via feeders that are partially shown as dashed lines in FIG. 19. The battery 1938 accumulates power supplied from the vehicle.

In the vehicle navigation equipment 1920 shown in FIG. 19, the decoding unit 1320, the coding unit 1330 and the measuring unit 1340 shown in FIG. 13 may be implemented by the processor 1921. At least a part of the functions may also be implemented by the processor 1921. For example, the processor 1921 may decode the downlink information, code the random access code and calculate the channel quality by executing instructions stored in the memory 1922.

The technology of the present disclosure may also be implemented as a vehicle system (or a vehicle) 1940 including one or more blocks in the vehicle navigation equipment 1920, the vehicle network 1941, and a vehicle module 1942. The vehicle module 1942 generates vehicle data (such as a vehicle speed, an engine speed, and fault information), and outputs the generated data to the vehicle network 1941.

Preferred embodiments of the present disclosure are described above with reference to the drawings. However, the present disclosure is not limited to the above examples. Those skilled in the art may obtain various modifications and changes within the scope of the appended claims. It should understand that these modifications and changes fall within the technical scope of the present disclosure.

For example, a unit shown with a dashed-line block in functional block diagrams shown in the drawings is optional in a corresponding equipment. Further, optional functional units may be combined in a suitable manner to achieve required functions.

For example, in the above embodiments, multiple functions included in one unit may be achieved by separate apparatuses. Alternately, in the above embodiments, multiple functions achieved by multiple units may be achieved by separate apparatuses. In addition, one of the above functions may be achieved by multiple units. These configurations should be included in the technical scope of the present disclosure.

In this specification, the steps described in the flowcharts include not only processing performed in time series in the described order but also processing performed in parallel or individually instead of in time series. In addition, the steps performed in time series may be performed in a different order.

Although the embodiments of the present disclosure are described above in detail with reference to the drawings, it should be understood that the above-described embodiments are merely used for illustrating the present disclosure rather than intended to limit the present disclosure. Those skilled in the art can make various modifications and variations to the above-described embodiments without departing from the substance and scope of the present disclosure. Therefore, the scope of the present disclosure is defined only by the appended claims and their equivalents.

The invention claimed is:

1. An electronic equipment configured to be a network side equipment, the electronic equipment comprising processing circuitry configured to:
   receive, from a user equipment, a random access request message to request a direct access to a satellite equipment by the user equipment; and
   in response to the random access request message:
      send a satellite position information request to the satellite equipment;
      in response to the satellite position information request, receive a satellite position from the satellite equipment;
      based on the received satellite position, calculate a time advance between the network side equipment and the satellite equipment;
      send, to the user equipment, a random access response message that includes control information related to an uplink data transmission directly from the user equipment to the satellite equipment,
   wherein the control information comprises a physical layer parameter related to the uplink data transmission directly from the user equipment to the satellite equipment,
   wherein the physical layer parameter comprises each of:
      information about an uplink transmission power for the user equipment to use when transmitting to the satellite equipment;
      information about a Modulation and Coding Scheme (MCS) for the user equipment to use when transmitting to the satellite equipment;
      information about uplink resources for the user equipment to use when transmitting to the satellite equipment; and
      information about the calculated time advance between the network side equipment and the satellite equipment,
   wherein the processing circuitry is further configured to:
      receive, from the user equipment, information related to a communication demand;

select the satellite equipment that the user equipment is to access from a plurality of satellite equipment according to the information related to the communication demand; and send information on the selected satellite equipment that the user equipment is to access, to the user equipment.

2. The electronic equipment according to claim 1, wherein the processing circuitry is further configured to:

send, to the user equipment, switching instruction information representing switching from a satellite equipment currently accessed by the user equipment to the satellite equipment that the user equipment is to access.

3. The electronic equipment according to claim 2, wherein the processing circuitry is further configured to:

receive, from the user equipment, channel quality information between the user equipment and each of the plurality of satellite equipments, including the satellite equipment currently accessed by the user equipment and the satellite equipment that the user equipment is to access; and determine, according to the channel quality information between the user equipment and each of the plurality of satellite equipments, the satellite equipment that the user equipment is to access.

4. The electronic equipment according to claim 2, wherein the processing circuitry is further configured to:

receive buffer status report information from the user equipment and send the buffer status report information to the satellite equipment currently accessed by the user equipment; and receive uplink resource information for the user equipment from the satellite equipment currently accessed by the user equipment and send the uplink resource information to the user equipment.

5. The electronic equipment according to claim 4, wherein the processing circuitry is further configured to:

merge buffer status report information of a plurality of user equipments currently accessing the same satellite equipment and send the merged information to the satellite equipment currently accessed.

6. The electronic equipment according to claim 4, wherein the processing circuitry is further configured to:

receive, from the satellite equipment currently accessed by the user equipment, merged uplink resource information for a plurality of user equipments; and determine, according to the merged uplink resource information, uplink resource information for each of the plurality of user equipments.

7. The electronic equipment according to claim 4, wherein the processing circuitry is further configured to:

send the uplink resource information by time resources different from those used by the satellite equipment currently accessed or by frequency resources different from those used by the satellite equipment currently accessed.

8. The electronic equipment according to claim 2, wherein the processing circuitry is further configured to:

use information about an uplink transmission power for uplink transmission between the electronic equipment and the satellite equipment currently accessed by the user equipment, as the uplink transmission power information for the user equipment to use when transmitting to the satellite equipment; and send updates to the information about the uplink transmission power for the user equipment to use when transmitting to the satellite equipment to the user equipment before each uplink transmission of the user equipment.

9. The electronic equipment according to claim 8, wherein the processing circuitry is further configured to:

receive, from the satellite equipment currently accessed by the user equipment, information about uplink transmission power used by the electronic equipment while transmitting to the satellite equipment currently accessed by the user equipment, or calculate, according to a position of the satellite equipment currently accessed or current time information, the information about the uplink transmission power used by the electronic equipment while transmitting to the satellite equipment currently accessed by the user equipment.

10. The electronic equipment according to claim 8, wherein the processing circuitry is further configured to:

send the information about the uplink transmission power by time resources different from those used by the satellite equipment currently accessed by the user equipment or by frequency resources different from those used by the satellite equipment currently accessed by the user equipment.

11. A user equipment, comprising processing circuitry configured to:

send, to a network side equipment, a random access request message to request a direct access to a satellite equipment by the user equipment; and in response to the random access request message, receive, from the network side equipment, control information related to an uplink data transmission directly between the user equipment and the satellite equipment, wherein the control information comprises a physical layer parameter related to the uplink data transmission, wherein the physical layer parameter comprises each of:
information about an uplink transmission power for the user equipment to use when transmitting to the satellite equipment;
information about a Modulation and Coding Scheme (MCS) for the user equipment to use when transmitting to the satellite equipment;
information about uplink resources for the user equipment to use when transmitting to the satellite equipment;
information about a time advance between the network side equipment and the satellite equipment; and communicate directly with the satellite equipment based on the control information, wherein the processing circuitry is further configured to:
send, to the network side equipment, information related to a communication demand so as to enable the network side equipment to select the satellite equipment that the user equipment is to access from a plurality of satellite equipment according to the information related to the communication demand; and
receive, from the satellite equipment that the user equipment is to access or the network side equipment, information on the satellite equipment that the user equipment is to access.

12. The user equipment according to claim 11, wherein the processing circuitry is further configured to:

receive, from a satellite equipment currently accessed by the user equipment or the network side equipment, switching instruction information representing switching from the satellite equipment currently accessed to the satellite equipment that the user equipment is to access.

13. The user equipment according to claim 12, wherein the processing circuitry is further configured to:
send channel quality information between the user equipment and each of the plurality of satellite equipments, including the satellite equipment currently accessed and the satellite equipment that the user equipment is to access, to the network side equipment, for the satellite equipment currently accessed or the network side equipment to determine the satellite equipment that the user equipment is to access according to the channel quality information between the user equipment and each of the plurality of satellite equipments.

14. The user equipment according to claim 12, wherein the processing circuitry is further configured to:
send buffer status report information to the network side equipment; and
receive uplink resource information for the user equipment from the satellite equipment currently accessed by the user equipment or the network side equipment.

15. The user equipment according to claim 11, wherein the processing circuitry is further configured to:
receive updates to the information about the uplink transmission power from the network side equipment before each uplink transmission of the user equipment.

16. A wireless communication method performed by an electronic equipment configured to be a network side equipment, the method comprising:
receiving, from a user equipment, a random access request message to request a direct access to a satellite equipment by the user equipment; and
in response to the random access request message:
sending a satellite position information request to the satellite equipment;
in response to the satellite position information request, receiving satellite position from the satellite equipment;
based on the received satellite position, calculating a time advance between the network side equipment and the satellite equipment;
sending, to the user equipment, a random access response message that includes control information related to an uplink data transmission directly between the user equipment and the satellite equipment,
wherein the control information comprises a physical layer parameter related to the uplink data transmission directly from the user equipment to the satellite equipment,
wherein the physical layer parameter comprises each of:
information about an uplink transmission power for the user equipment to use when transmitting to the satellite equipment;
information about a Modulation and Coding Scheme (MCS) for the user equipment to use when transmitting to the satellite equipment;
information about uplink resources for the user equipment to use when transmitting to the satellite equipment; and
information about the calculated time advance between the network side equipment and the satellite equipment,
wherein the method further comprises:
receiving, from the user equipment, information related to a communication demand;
selecting the satellite equipment that the user equipment is to access from a plurality of satellite equipment according to the information related to the communication demand; and
sending information on the selected satellite equipment that the user equipment is to access, to the user equipment.

* * * * *